(12) United States Patent
Tsai et al.

(10) Patent No.: US 11,036,459 B2
(45) Date of Patent: Jun. 15, 2021

(54) TWO-DIMENSIONAL PALETTE CODING FOR SCREEN CONTENT CODING

(71) Applicant: VID SCALE, INC., Wilmington, DE (US)

(72) Inventors: Chia-Ming Tsai, San Diego, CA (US); Xiaoyu Xiu, San Diego, CA (US); Yan Ye, San Diego, CA (US); Yuwen He, San Diego, CA (US)

(73) Assignee: VID Scale, Inc., Wilmington, DE (US)

( * ) Notice: Subject to any disclaimer, the term of this patent is extended or adjusted under 35 U.S.C. 154(b) by 166 days.

(21) Appl. No.: 16/023,125

(22) Filed: Jun. 29, 2018

(65) Prior Publication Data

US 2018/0307457 A1   Oct. 25, 2018

Related U.S. Application Data

(63) Continuation of application No. 14/588,868, filed on Jan. 2, 2015, now Pat. No. 10,055,189.
(Continued)

(51) Int. Cl.
*H04N 7/12* (2006.01)
*G06F 3/14* (2006.01)
(Continued)

(52) U.S. Cl.
CPC ......... *G06F 3/1454* (2013.01); *H04N 19/129* (2014.11); *H04N 19/147* (2014.11);
(Continued)

(58) Field of Classification Search
CPC .................................................... G06F 3/1454
See application file for complete search history.

(56) References Cited

U.S. PATENT DOCUMENTS

| 7,091,985 B1 | 8/2006 | Towns et al. |
| 2002/0039441 A1 | 4/2002 | Klassen |

(Continued)

FOREIGN PATENT DOCUMENTS

| CN | 1625893 A | 6/2005 |
| CN | 101416220 A | 4/2009 |

(Continued)

OTHER PUBLICATIONS

Guo et al., "Palette Mode for Screen Content Coding", Document: JCTVC-M0323, Qualcomm Incorporated, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-11.

(Continued)

*Primary Examiner* — Peet Dhillon
(74) *Attorney, Agent, or Firm* — Condo Roccia Koptiw LLP

(57) ABSTRACT

Video data, e.g., screen content video data may be palette coded. A palette table including one or more color indices may be produced. A color index may correspond to one color. A palette index map may be created that maps one or more pixels of the video data to a color index in the palette table, or a color that may be explicitly coded. A palette index map prediction data may be generated that includes data that indicates values in the palette index map associated with at least some portions of the video data that are generated in a traverse scan order in which a scan line is scanned in an opposite direction of a preceding parallel scan line.

11 Claims, 17 Drawing Sheets

US 11,036,459 B2

Page 2

Related U.S. Application Data

(60) Provisional application No. 62/016,562, filed on Jun. 24, 2014, provisional application No. 62/002,144, filed on May 22, 2014, provisional application No. 61/974,961, filed on Apr. 3, 2014, provisional application No. 61/953,704, filed on Mar. 14, 2014, provisional application No. 61/923,132, filed on Jan. 2, 2014.

(51) Int. Cl.
| | |
|---|---|
| *H04N 19/593* | (2014.01) |
| *H04N 19/567* | (2014.01) |
| *H04N 19/44* | (2014.01) |
| *H04N 19/61* | (2014.01) |
| *H04N 19/70* | (2014.01) |
| *H04N 19/147* | (2014.01) |
| *H04N 19/129* | (2014.01) |
| *H04N 19/463* | (2014.01) |
| *H04N 19/186* | (2014.01) |
| *H04N 19/90* | (2014.01) |

(52) U.S. Cl.
CPC .......... *H04N 19/186* (2014.11); *H04N 19/44* (2014.11); *H04N 19/463* (2014.11); *H04N 19/567* (2014.11); *H04N 19/593* (2014.11); *H04N 19/61* (2014.11); *H04N 19/70* (2014.11); *H04N 19/90* (2014.11)

(56) References Cited

U.S. PATENT DOCUMENTS

| | | | |
|---|---|---|---|
| 2005/0152605 A1 | 7/2005 | Hoogendijk | |
| 2007/0116370 A1 | 5/2007 | Smirnov | |
| 2007/0195369 A1 | 8/2007 | McDowell et al. | |
| 2015/0016501 A1 | 1/2015 | Guo et al. | |
| 2015/0146976 A1 | 5/2015 | Ma et al. | |
| 2015/0373340 A1* | 12/2015 | Zou ...................... | H04N 19/70 375/240.24 |
| 2016/0309172 A1 | 10/2016 | Laroche et al. | |
| 2016/0316214 A1 | 10/2016 | Gisquet et al. | |

FOREIGN PATENT DOCUMENTS

| | | |
|---|---|---|
| CN | 101645173 A | 2/2010 |
| CN | 102611888 A | 7/2012 |
| JP | 2017-505010 A | 2/2017 |
| WO | WO 2014/165784 A1 | 10/2014 |
| WO | WO 2014/165789 A1 | 10/2014 |
| WO | WO 2015/006724 A2 | 1/2015 |
| WO | WO 2015/086717 A2 | 6/2015 |
| WO | WO 2015/086718 A2 | 6/2015 |
| WO | WO 2015/096157 A1 | 7/2015 |

OTHER PUBLICATIONS

Bross et al., "High Efficiency Video Coding (HEVC) Text Specification Draft 10 (for FDIS & Consent)", JCTVC-L1003, 12th Meeting: Geneva, CH, Jan. 14-23, 2013, 321 pages.

Gisquet et al., "AhG10: Palette Predictor Stuffing", Canon, JCTVC-Q0063, 17th Meeting: Valencia, ES, Mar. 27-Apr. 4, 2014, 4 pages.
Guo et al., "AHG8: Major-Color-Based Screen Content Coding", Microsoft Corporation, JCTVC-O0182, 15th Meeting: Geneva, CH, Oct. 23-Nov. 1, 2013, 10 pages.
Guo et al., "Evaluation of Palette Mode Coding on HM-12.0+RExt-4.1", Qualcomm Incorporated, JCTVC-O0218, 15th Meeting: Geneva, CH, Oct. 23-Nov. 1, 2013, 6 pages.
Guo et al., "Non-RCE3: Modified Palette Mode for Screen Content Coding", Qualcomm Incorporated, JCTVC-N0249, 14th Meeting: Vienna, AT, Jul. 25-Aug. 2, 2013, 6 pages.
Guo et al., "Palette Mode for Screen Content Coding", Qualcomm Incorporated, JCTVC-M0323, 13th Meeting: Incheon, KR, Apr. 18-26, 2013, 5 pages.
Guo et al., "RCE3: Results of Test 3.1 on Palette Mode for Screen Content Coding", Qualcomm Incorporated, Document No. JCTVC-N0247, 14th Meeting, Vienna, AT, Jul. 25-Aug. 2, 2013, 7 pages.
ITU/ISO/IEC, "Joint Call for Proposals for Coding of Screen Content", ISO/IEC JTC1/SC29/WG11 MPEG2014/N14175, San Jose, USA, Jan. 2014, 16 pages.
Jin et al., "Non-RCE4: Palette Prediction for Palette Coding", Samsung Electronics, Co., Ltd., 16th Meeting: San Jose, CA, Jan. 9-17, 2014, 15 pages.
Kobayashi et al., "Lossless Compression for Compound Color Document Images", IDW, HCS2-2, Jan. 1, 2001, pp. 1525-1528.
Laroche et al., "Non-RCE4: Palette Prediction for Palette Mode", Canon, JCTVC-P0114, 16th Meeting: San Jose, US, Jan. 9-17, 2014, 7 pages.
Lin et al., "AHG8: P2M Based Dual-Coder Extension of HEVC", Tongji University, Shanghai, China, JCTVC-L0303, 12th Meeting: Geneva, CH, Jan. 14-23, 2013, 5 pages.
Pang et al., "Non-RCE3: Intra Motion Compensation with 2-D MVs", Qualcomm, Inc., JCTVC-N0256, 14th Meeting: Vienna, AT, Jul. 25-Aug. 2, 2013, 12 pages.
Park et al., "Non-RCE4: on Palette Update for Palette Coding", Samsung Electronics Co., Ltd., JCTVC-P0091, 16th Meeting: San Jose, US, Jan. 9-17, 2014, 7 pages.
Sole et al., "AhG8: Requirements for Wireless Display Applications", Qualcomm, JCTVC-M0315, 13th Meeting: Incheon, KR, Apr. 18-26, 2013, 2 pages.
Sullivan et al., "Rate-Distortion Optimization for Video Compression", IEEE Signal Processing Magazine, vol. 15, No. 6, Nov. 1998, pp. 74-90.
Vermeir, Thijs, "Use Cases and Requirements for Lossless and Screen Content Coding", Barco, JCTVC-M0172, 13th Meeting: Incheon, KR, Apr. 18-26, 2013, 6 pages.
Xiu et al., "Description of Screen Content Coding Technology Proposal by InterDigital", InterDigital Communications, LLC, JCTVC-Q0037, 17th Meeting: Valencia, ES, Mar. 27-Apr. 4, 2014, 30 pages.
Yang et al., "Entropy Constrained Color Splitting for Palette Images", IEEE International Conference on Multimedia and Expo, ICME, Jun. 28-Jul. 3, 2009, pp. 109-112.
Zhu et al., "Palette-Based Compound Image Compression in HEVC by Exploiting Non-Local Spatial Correlation", IEEE International Conference on Acoustics, Speech and Signal Processing (ICASSP), May 4-9, 2014, pp. 7348-7352.
Zhu et al., "Template-Based Palette Prediction", Huawei Technologies Co., Ltd, Document No. JCTVC-N0169, 13th Meeting, Incheon, KR, Apr. 18-26, 2013, 7 pages.

\* cited by examiner (a)

TWO-DIMENSIONAL PALETTE CODING FOR SCREEN CONTENT CODING

CROSS-REFERENCE TO RELATED APPLICATIONS

This application is a continuation application of U.S. Non-Provisional Application No. 14/588,868, filed Jan. 2, 2015, which claims the benefit of U.S. Provisional Patent Application No. 61/923,132, filed Jan. 2, 2014, U.S. Provisional Patent Application No. 61/953,704, filed Mar. 14, 2014, U.S. Provisional Patent Application No. 61/974,961, filed Apr. 3, 2014, U.S. Provisional Patent Application No. 62/002,144, filed May 22, 2014, and U.S. Provisional Patent Application No. 62/016,562, filed Jun. 24, 2014, the disclosures of which are hereby incorporated herein by reference.

BACKGROUND

Screen content sharing applications have become very popular in recent years with the increased popularity of remote desktop, video conferencing, and mobile media presentation applications. There may be application requirements from industries. Screen content may refer to video may include, for example, outlines (e.g., to visually separate two separate pictures shown simultaneously on a monitor), words, line drawings, etc. Screen content may include numerous blocks with a few major colors and sharp edges due to a prevalence of sharp curves, text, and the like in the video content.

Video compression methods may be used to encode screen content. Some compression methods may not fully characterize the features of screen content, which may lead to inefficient compression performance. Furthermore, the reconstructed picture at the receiver may have quality issues. For example, the curves and texts may be blurred and difficult to recognize.

Video compression methods that are efficient for screen content are becoming increasingly important as more people are sharing their device content for media presentations and remote desktop purposes. Furthermore, screen display resolution of mobile devices has substantially increased to high definition or ultra-high definition resolutions. Video coding tools, such as block coding modes and transform, may not be optimized for screen content encoding and may increase the bandwidth consumption for transmitting screen content.

SUMMARY

Methods, systems, and instrumentalities are disclosed for video data coding with a palette coding mode, e.g., screen content video data coding. Video data, e.g., screen content video data may be palette coded. A palette table containing one or more color indices may be produced. A color index may correspond to a color. A palette index map may be created. The palette index map may map one or more pixels of the video data to a color index in the palette table. A traverse raster scan may be performed. A scan line may be scanned in an opposite direction of a preceding parallel scan line. Based on the traverse scan, a palette index map prediction data may be generated that may indicate values in the palette index map associated with at least some portions of the video data.

The scan lines may be horizontal scan lines. The scan lines may be vertical scan lines. Whether the scan lines are horizontal scan lines or vertical scan lines may be signaled. The palette table may be produced based at least on a cost function representing a cost to encode the palette table. The palette index map prediction data may comprise data that may indicate values for at least some portions of the video data in terms of a run value from a base portion of the video data. The run value may represent the number of consecutive video portions in a sequence of video portions that have the same color index as the base portion and may be coded as a difference between respective run values of first and second rows.

The palette table may be copied from a plurality of colors generated from a palette table predictor. A dictionary or palette table predictor may be generated that comprises a plurality of previous color values. The previous color values may be updated with the color indices of the palette table.

BRIEF DESCRIPTION OF THE DRAWINGS

A more detailed understanding may be had from the following description, given by way of example in conjunction with the accompanying drawings wherein:

FIG. 12 illustrates an example of run coding;

DETAILED DESCRIPTION

Figure 1:
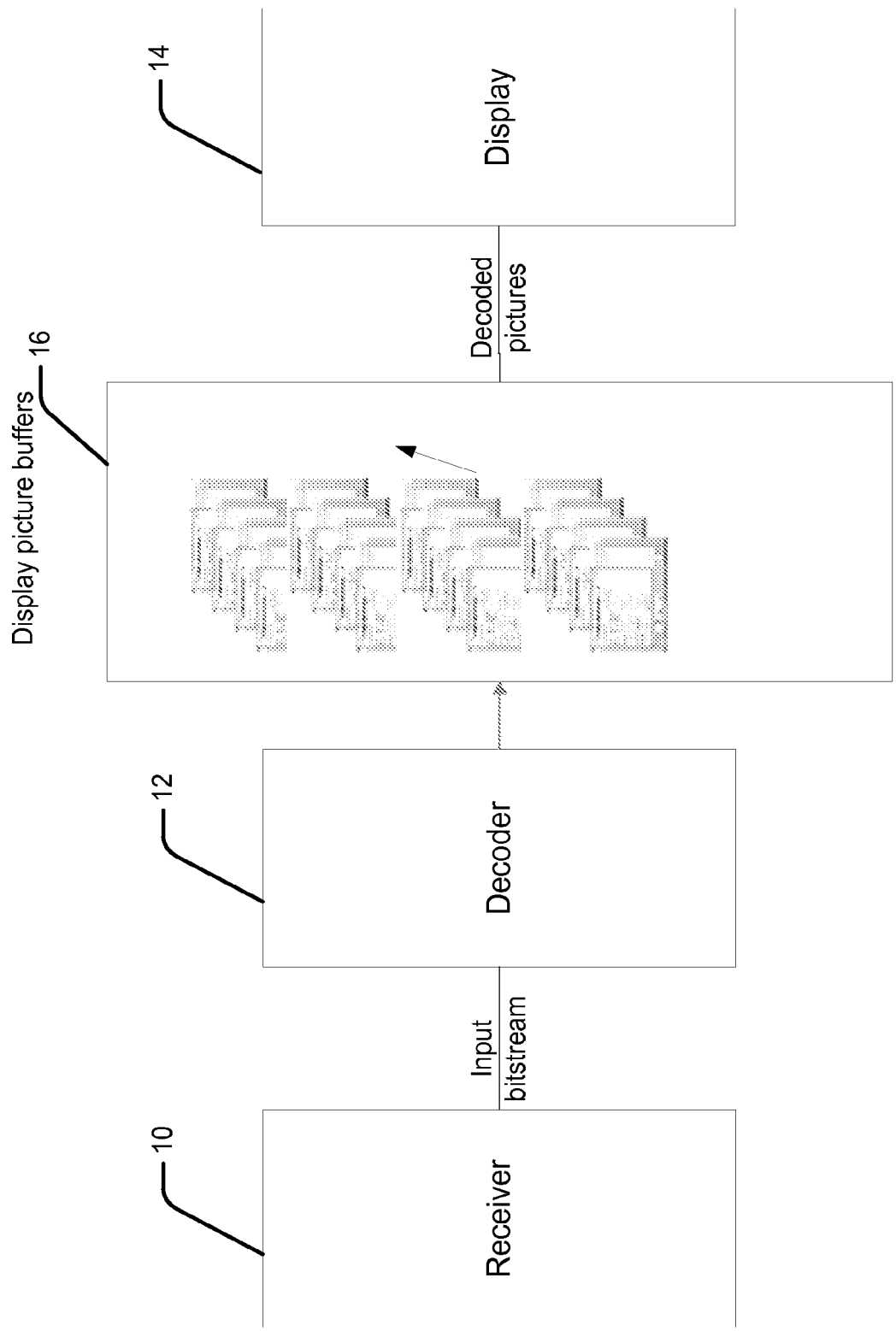
FIG. 1 is a block diagram of a screen content sharing system.

FIG. 1 is a block diagram illustrating an example screen content sharing system. The screen content sharing system may include a receiver 10, a decoder 12, and a display (e.g., a renderer) 14. The receiver 10 may receive video signals and may demodulate them for forwarding to the decoder 12, which may decode the video stream and may generate a plurality of separate pictures stored in multiple picture buffers 16 that may be output to the display 14.

Figure 2:
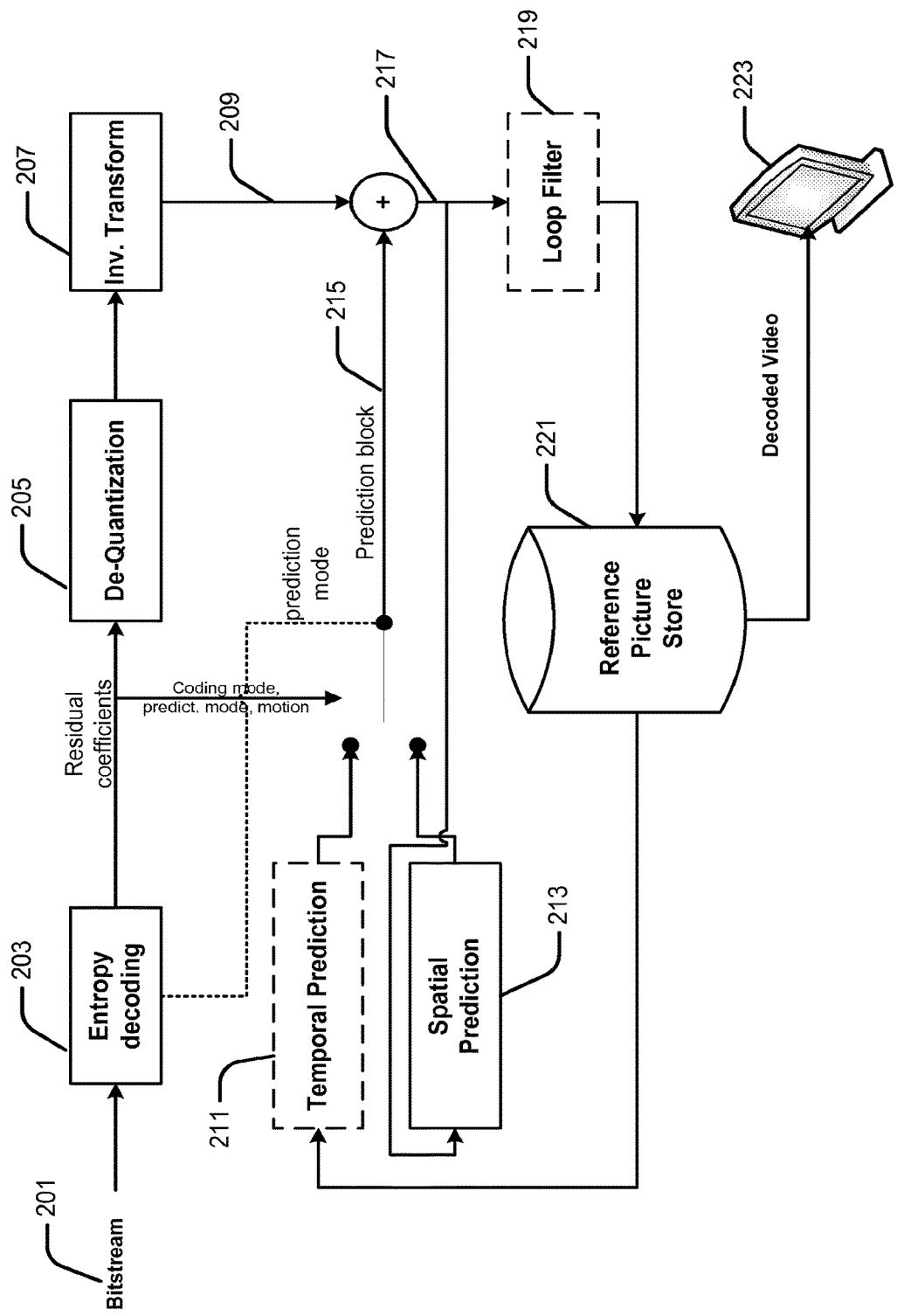
FIG. 2 is a block diagram of a video decoder.

FIG. 2 is a block diagram illustrating an example block-based single layer decoder that may be used as decoder 12 in FIG. 1. It may receive a video bitstream 201 produced by an encoder and reconstructs the video signal to be displayed. At the video decoder, the bitstream 201 may be parsed by the entropy decoder 203. The residual coefficients may be inverse quantized in de-quantizer logical block 205 and inverse transformed in inverse transform logical block 207 to obtain the reconstructed residual signal 209. The coding mode and prediction information may be used to obtain the prediction signal using either spatial prediction (e.g., spatial prediction logical block 211) or temporal prediction (e.g., temporal prediction logical block 213). The prediction signal 215 and the reconstructed residual signal 209 may be added together to obtain the reconstructed video signal 217. The reconstructed video may additionally go through loop filtering (e.g., loop filter logical block 219) before being stored in the reference picture store 221 to be displayed on monitor 223 and/or used to decode a future video signal.

Figure 3:
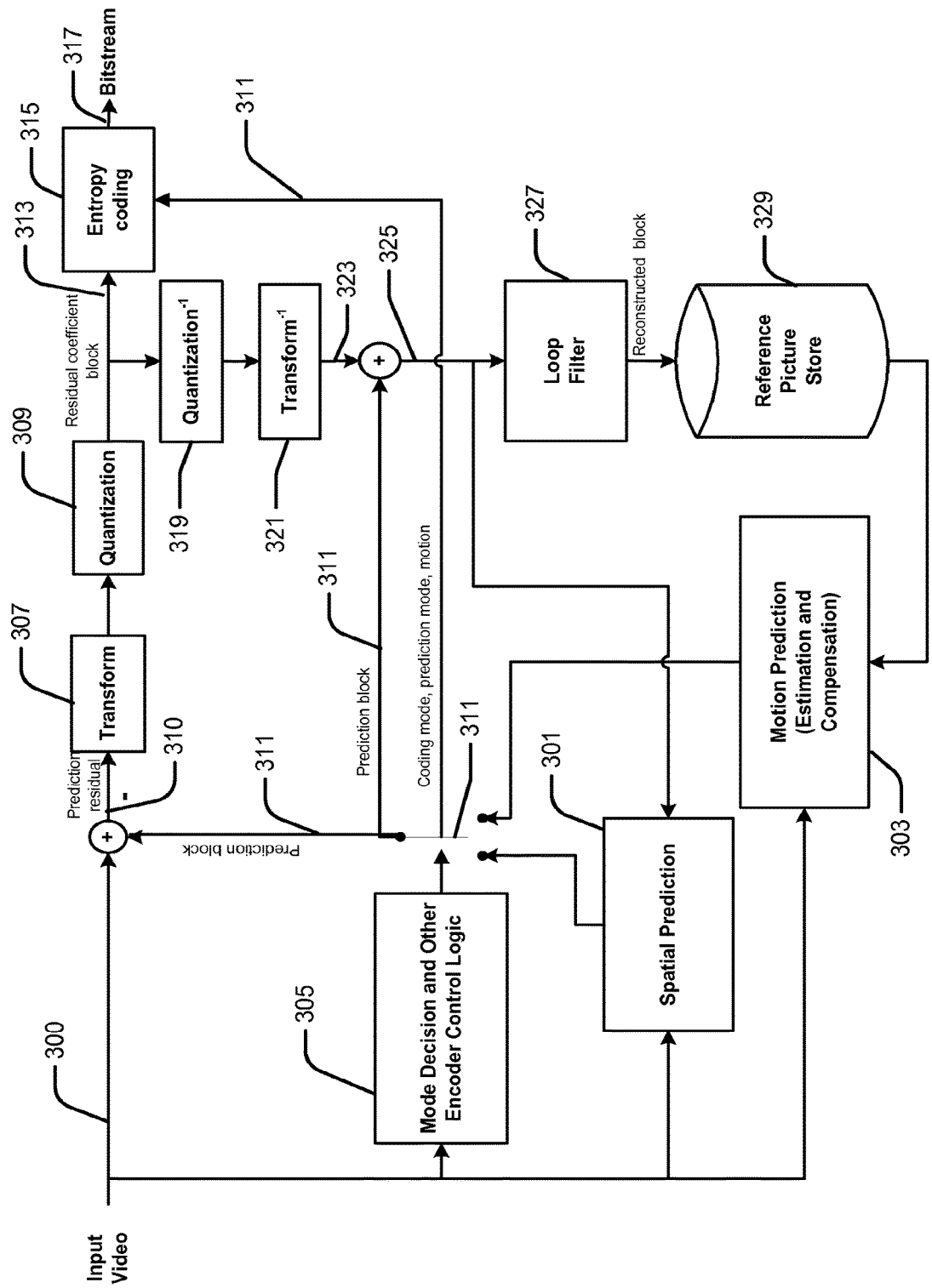
FIG. 3 is a block diagram of a video encoder.

FIG. 3 is a block diagram illustrating an example block-based single layer video encoder that may be used to generate the encoded video data received at the screen content sharing system of FIG. 1. As shown in FIG. 3, to achieve efficient compression, a single layer encoder may employ, for example, spatial prediction (e.g., intra prediction) at block 301 and/or temporal prediction (e.g., inter prediction and/or motion compensated prediction) at block 303 to predict the input video signal 300. The encoder may also have mode decision logic 305 that may choose a suitable form (e.g., the most suitable form) of prediction, for example, based on certain criteria such as a combination of rate and distortion considerations. The encoder may then transform at block 307 and/or quantize at block 309 the prediction residual 310 (e.g., the difference signal between the input signal 300 and the prediction signal 311). The quantized residual 313, together with the mode information (e.g., intra or inter prediction) and prediction information 311 (e.g., motion vectors, reference picture indices, intra prediction modes, etc.) may be further compressed at the entropy coder 315 and packed into the output video bitstream 317. As shown in FIG. 3, the encoder may generate the reconstructed video signal 325 by applying inverse quantization at block 319 and/or inverse transformation at block 321 to the quantized residual to obtain a reconstructed residual 323, and adding it back to the prediction signal 311. The reconstructed video signal 325 may additionally go through a loop filter 327 (for example, a deblocking filter, Sample Adaptive Offsets, and/or Adaptive Loop Filters), and may be stored in a reference picture store 329 to be used to predict future video signals.

Figure 4:
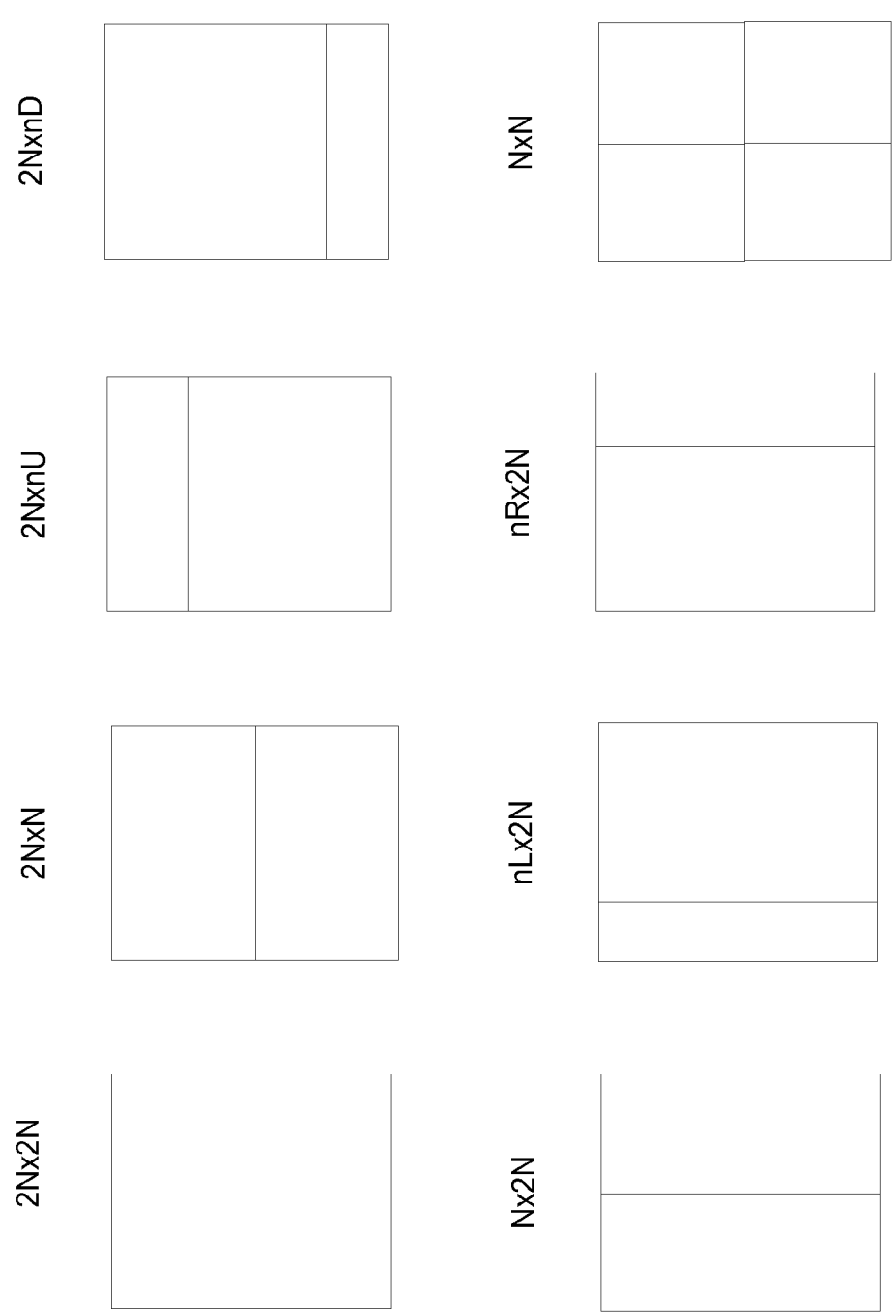
FIG. 4 illustrates the eight prediction unit modes in HEVC.

MPEG has been working on video coding standards to save transmission bandwidth and storage. High Efficiency Video Coding (HEVC) is an emerging video compression standard jointly developed by the ITU-T Video Coding Experts Group (VCEG) and ISO/IEC Moving Picture Experts Group (MPEG). HEVC may save 50% in bandwidth compared to H.264 while producing the same video quality at the decoder/receiver. HEVC may be a block-based hybrid video coding standard in that its encoder and decoder may operate according to FIGS. 2 and 3. HEVC may allow the use of larger video blocks, and may use quadtree partition to signal block coding information. The picture or slice may be partitioned into coding tree blocks (CTBs) with the same size (e.g., 64×64). A CTB may be partitioned into coding units (CUs) with quadtree, and a CU may be partitioned further into prediction units (PU), and transform units (TU) using quadtree. For each inter coded CU, its PU may have one of eight partition modes, as shown in FIG. 4. Temporal prediction, also called motion compensated prediction, may be applied to reconstruct the inter coded PUs. Depending on the precision of the motion vectors, which may be up to quarter pixel in HEVC, linear interpolation filters may be applied to obtain pixel values at fractional positions from neighboring pixels at integer positions. In HEVC, the interpolation filters may have seven or eight taps for luma and four taps for chroma. The deblocking filter in HEVC may be content-dependent. Different deblocking filter operations may be applied at the TU and PU boundaries, depending on a number of factors, such as coding mode difference, motion vector difference, reference picture difference, pixel value difference, etc. For entropy coding, HEVC may adopt context-based adaptive arithmetic binary coding (CABAC) for most block level syntax elements except high level parameters. CABAC coding may use context-based coded regular bins and/or by-pass coded bins without context.

Although the HEVC design includes various block coding modes, it may not fully take advantage of the spatial redundancy found in screen content. HEVC may be focused on continuous tone video content in a 4:2:0 format, and the mode decision and transform coding tools may not be optimized for the discrete tone content that may be captured in the format of 4:4:4 video. Screen content material, such as text and graphics, may show different characteristics than natural video content. Coding tools may improve the coding efficiency of screen content coding, e.g., based on palette coding and/or intra block copy.

Figure 5B:
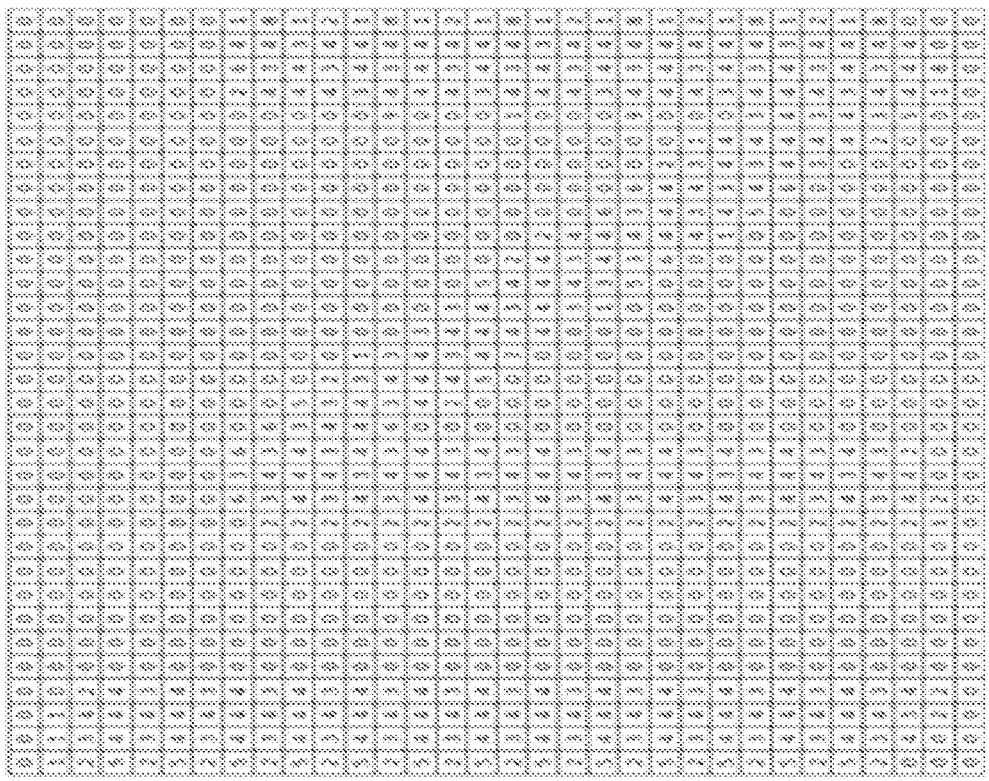
FIG. 5B shows a palette index map of the piece of screen content of FIG. 5A.
Figure 5A:
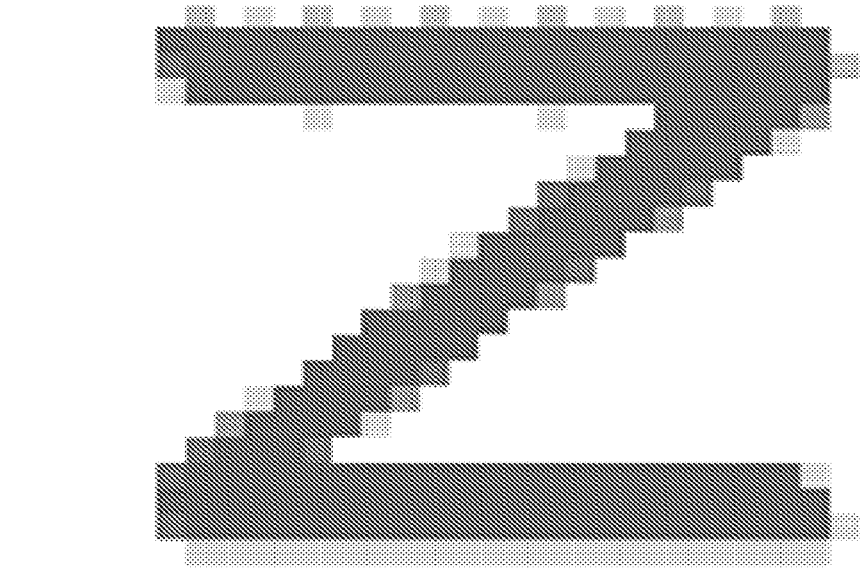
FIG. 5A illustrates an exemplary piece of screen content in the form of a word.
Figure 5A:

As shown in FIG. 5A, screen content blocks may include a limited number of colors, and the color value of each pixel may be repeated from an adjacent (e.g., above or left) pixel. A palette table may be used as a dictionary to record the significant pixel values and the corresponding palette index map may be used to represent the color value of each pixel, as shown in FIG. 5B. To reduce the spatial redundancy, "run" values may be used to indicate the length of consecutive pixels that have the same significant pixel values (e.g., palette index). Using a palette-based coding method rather than block coding modes may improve the compression performance for coding screen content.

A two-dimensional palette coding method for effectively compressing screen content may be based on a two-dimensional coding pattern that may group pixels together into larger units so that the magnitude of "run" and the amount of coding symbols may be reduced. Palette table generation, palette table prediction, and/or palette table index grouping may improve the performance of various components of palette coding, for example, for screen content coding. Additionally, encoding methods and apparatus are disclosed that allow the encoder to generate efficient screen content bitstreams. The palette coding techniques disclosed herein may be applied to HEVC or other video codecs.

Some video coding standards may not fully optimize the compression performance of screen content coding. For example, some general purpose encoders may be optimized for natural video sequences. Screen content may include many more sharp edges with discrete color distribution and discontinuous tone than natural video sequences. After applying conventional mode decision and transform-based coding processes, most residual values are located in high frequency areas such that the residual scan method may be inefficient for the entropy coding process that may follow. A palette-based coding method may improve the coding performance of screen content blocks. For example, a palette may be formed by selecting the commonly appearing colors in the block that is being encoded from a color histogram. A CU pixel may be converted to a palette index by searching for the most similar element in the palette table. A run value may indicate a number of consecutive pixel positions that share the same palette index. One or more prediction modes, such as run mode and copy mode, may be used to indicate whether the palette index of the current pixel is predicted from the palette index of the pixel to the left of the current pixel position in horizontal raster scan order or predicted from the pixel positioned above the current pixel position.

A CU pixel may be clustered into major colors and escape colors to form the palette table. A line mode may be used to encode the palette index. The spatial redundancy of palette index map pixel by pixel (e.g., run length may be generated in units of 1×1 pixel) may be exploited. A large number of bits may be generated to signal copy mode or run mode and run values, which may be inefficient, for example, for coding larger size blocks.

A histogram-based method may be used to generate the palette table. For example, the first N pixel values that appear most in a CU may be used to generate the palette table of the CU. In the case of lossy coding (e.g., decoded video may be numerically non-identical to the original video), the pixel values that are close to an entry of the palette table may be quantized to the color represented by that entry. The pixel values that exist in the original CU may be selected as elements of the palette table.

An element of the palette table of a CU may be predicted from the corresponding element of the palette table of its left or above neighbor. Such element-wise prediction may involve signaling flags to indicate the prediction operation for an element of a palette table.

Palette table coding and palette map coding may be performed. For example, a two-dimensional palette index grouping method may group palette indices into larger units, such that the magnitude of run length may be reduced.

A mean value-based palette table generation method may form the colors in the palette table of a CU. For example, the average of the colors that fall in the same quantization zone may be used as a representative color in the palette table.

A palette merge method may generate the colors that are used to predict the color elements in the palette table of a CU by combining the representative colors of the previously coded CUs.

In a palette table reuse mode, a CU may copy its palette table from the colors generated from the palette table predictor. If the palette table is copied, the signaling a palette table may be omitted.

A two-dimensional palette coding method for screen content coding may involve palette table generation, palette index map generation, and/or palette index prediction.

A block of screen content may include sharp edges with discrete color distribution. A palette table may be used to record the k most commonly appearing color values in the block of video. Three individual palette tables may be used to record a color component of YUV or RGB color format; an entry of the palette table may have one component. A palette table may be used to record all three color components together; an entry of the palette table may have three components. For example, in FIG. 5(a), there are nine colors in the screen content block. If a palette table is used, then nine color elements may be recorded in the table and indexed from 0 to 8.

Figure 10:
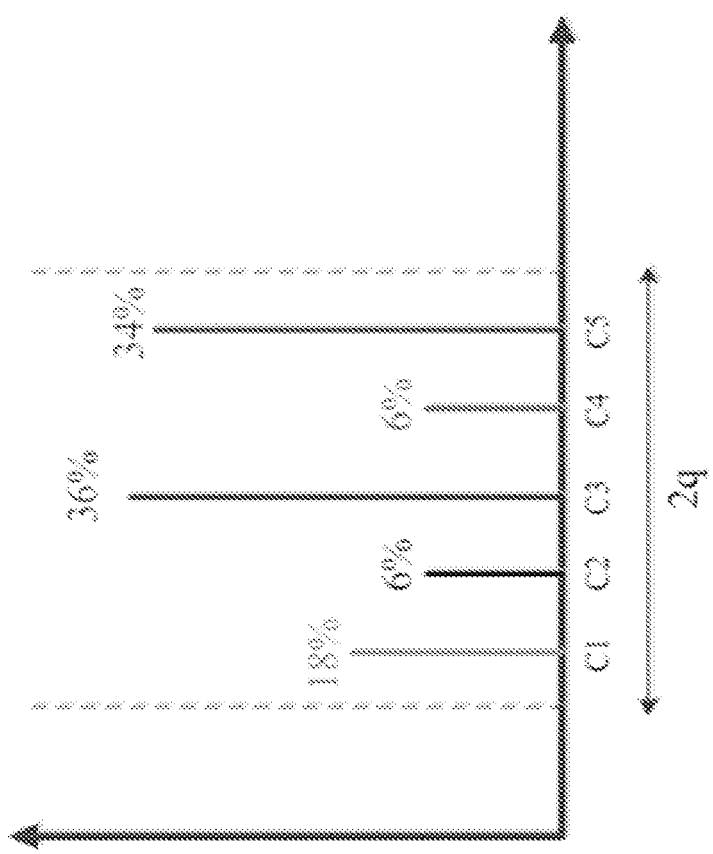
FIG. 10 illustrates an example of palette table generation.

A histogram-based method may be used to generate the representative colors in the palette table of one CU. The first N colors that appear most frequently in the current coded CU may be selected as the colors of the palette table. A quantization process may be used for palette table generation in the lossy coding. The color values that are close to a representative color may be quantized to that representative color. This histogram-based method may be performed when generating palette tables for CUs with unbalanced color distribution where the occurrence of one specific color may be statistically dominant over the other colors in that CU. However, this method may be inefficient for CUs with other color distributions and may result in a quality degradation of reconstructed CUs using a palette coding mode. For example, in FIG. 10, the quantization step may be q, and C3 may be one representative color selected by the original histogram-based palette table generation method. Four other colors, e.g., C1, C2, C4 and C5, may fall into the quantization zone centered at C3 (enclosed by the dotted lines in FIG. 10 with the length of 2q) after the quantization process. The occurrence percentages of C1, C2, C3, C4 and C5 may be 18%, 6%, 36%, 6%, and 34% respectively. Using a histogram-based palette table generation method, the color values of C1, C2, C4 and C5 may be mapped to C3 during the palette index mapping process (e.g., mapping the colors of the original picture into the entries of the generated palette table). This may produce a large reconstructive error for color C5 and may lead to a big distortion for the reconstructed CU as a whole due to the comparatively large occurrence percentage of C5 (34%) in the current CU. A mean-value based readjustment method may recalculate the representative color of one quantization zone based on the occurrences of the colors that are initially mapped into that quantization zone. For example, the updated representative color of each quantization zone may be derived as the weighted average of the colors that fall in the quantization zone with their relative percentage of occurrence, e.g., $$P'_j = \frac{\sum_i (C_{ji} \cdot P_{ji})}{\sum_i C_{ji}} \quad (1)$$

where $P_{ji}$ and $C_{ji}$ may be the pixel value and occurrence percentage of the $i^{th}$ color in the $j^{th}$ quantization zone, and $P'_j$ may be the derived representative color. Furthermore, other weighting metrics, such as sum of squared difference (SSD) and sum of absolute difference (SAD), may be applied to calculate representative colors. Equation (1) may be expressed as:

$$P'_j = \arg\min_{X \in \{P_{ji}\}} \sum_i C_{ji} \cdot Dist(X, P_{ji}) \quad (2)$$

$$P'_j = \arg\min_X \sum_i C_{ji} \cdot Dist(X, P_{ji}) \quad (3)$$

where the function Dist may be the weighting metric function to evaluate the distance between two colors. Equation (2) may be used to find an optimal representative color in an existing color set for $P_j$. Equation (3) may be used to find an optimal representative color without any constraint, e.g., the optimal color may be in the color set of the quantization zone or may not exist in the color set.

Palette table generation may be applied iteratively until optimization constraints may be satisfied. For example, a cost function after the $k^{th}$ iteration may be:

$$D^{(k)} = \Sigma_j \Sigma_i C_{ji}^{(k)} \cdot Dist(P_{ji}^{(k)}, P_j^{(k)}) \quad (4)$$

The iterative palette table generation process may continue (e.g., may be repeated iteratively) until the difference of the cost at the $k^{th}$ iteration and the cost at the $(k-1)^{th}$ iteration is less than $D^{Th}$ ($|D^{(k)}-D^{(k-1)}|<D^{Th}$) where $D^{Th}$ may be a threshold value. The iteration may continue until a predefined time, e.g., for a predefined duration. The iteration may continue until the difference between $P^{jt(k)}$ and $P^{jt(k-1)}$ is less than a (e.g., predefined) threshold.

The palette table may be encoded with predictive coding, for example, using a previously coded palette table, a palette dictionary, palette table predictor, and/or the like. A palette dictionary may be equivalent to a palette table predictor. Palette table generation may consider the overhead associated with encoding the palette table. The overhead associated with encoding the palette table may be considered, for example, by palette table refinement after color clustering. Predictive coding may be considered. If the number of clusters is greater than a threshold, e.g., the maximum palette table size allowed, certain clusters, e.g., the most effective clusters, may be selected.

If the representative color in the palette table is found in its predictor, the representative color may remain. Otherwise, a representative color may be selected. The selected representative color may be a color with a minimum rate distortion (RD) cost, which may be determined using Equation (5):

$$RDCost(k)=Distortion(k)+lambda \times R(k) \quad (5)$$

The representative color may be selected from color candidates, which may include the representative color derived from clustering and the colors in the predictor, such as the previous palette table or palette dictionary. In Equation (5), Distortion(k) may be the distortion associated with coding the pixels in the cluster with a specific color k. If k is from a predictor, R(k) may be a value that may indicate the cost (e.g., in bits) to specify which entry in the predictor list is used to predict k. R(k) may be approximated as:

$$R(k)=size(predictor)/size(palette\_table) \quad (6)$$

If k is not predicted from a predictor, R(k) may be a value that may represent the cost (e.g., in bits) of coding of that palette table entry without prediction. The palette table entry may be lossless coded. R(k) may be estimated as:

$$R(k)=\Sigma_{component=0}^{NUM\_COMPONENT} BitDepth(component) \quad (7)$$

After the representative colors of the clusters are determined, clusters with the same or substantially similar representative colors may be merged.

If the number of clusters exceeds a threshold, e.g., the maximum allowed palette table size, some clusters' representative colors may not be represented in the palette table. Certain clusters, e.g., the most effective clusters, may be selected for representation in the palette table. Pixels that may not be coded with the palette table may be coded as escape colors, which may be coded, e.g., explicitly. It may be considered a penalty if a cluster is not inside the palette table. The cost of the cluster c may be estimated as:

$$Cost(c)=Dist_{PLT(c)}+lambda \times R_{PLT(c)}-(Dist\_Esc(c)+lambda \times R\_Esc(c)) \quad (8)$$

In Equation (8), Dist_PLT(c) and R_PLT(c) may be the distortion and bits if the cluster c is represented in the palette table. Dist_Esc(c) and R_Esc(c) may be the distortion and bits if the cluster c is not represented in the palette table, e.g., if the cluster c is represented as an escape color. Based on the cost, the clusters may be sorted in an ascending order. The clusters in the front of the order (e.g., associated with the least cost) may be selected. The effect of merging clusters that are not selected in the palette table may be considered. For considering merging clusters that are not selected in the palette table, criteria may include the RD cost of coding pixels in a cluster as an escape color and/or the RD cost of coding pixels in a cluster as a color likely to be represented in the palette table.

For lossless coding, predictive coding may be ignored, e.g., considering predictive coding may not be applicable. The representative color of clusters may not be changed in lossless coding. When selecting clusters for representation in the palette table, the bit cost may be considered (e.g., distortion may be 0). Merging may be applied in lossless coding. Merging may not be applicable in lossless coding.

Palette table readjustment may be applied to other color clustering methods to find representative colors (e.g., optimal representative colors) for palette table generation. For example, a color division method may be used to divide the colors (e.g., all the colors) in the whole spectrum into equal quantization zones that can simplify the palette table process at the expense of lowering the quality of the reconstructed colors.

The palette table may be regenerated at the decoder to decode the pixels of palette coded CUs. A palette table prediction scheme may be applied. For example, a color element in the palette table of a CU can be predicted from the corresponding color element in the palette table of a neighboring CU. For example, the neighboring CU may include its above or left neighboring CU. The neighboring CU may include its below or right neighboring CU. This palette table prediction technique may be applied to CUs for which at least one of its above and left neighboring CUs is available. If both of the above and left neighboring CUs are not encoded in palette coding mode, such palette table prediction method may not be applied since there may be no palette table existing for non-palette coded CUs.

A palette table merge method may be performed to create and/or update the dictionary that may be used for predicting the palette table of the current CU. A dictionary may be created and/or initialized to a default value (e.g., to a set of generic or representative colors), and may be updated based on the colors actually selected for use in the palette table of one or more encoded CUs. The dictionary update process may merge the palette colors of the most recently encoded CU with the colors (e.g., the most often used or most important colors) of a previous version of the dictionary in order to produce an updated version of the dictionary. The updated version of the dictionary may be used to predict and/or to predictively encode the palette table of one or more future CUs. The updated version of the dictionary may be updated through additional application of the merging process.

A palette dictionary may store recently coded colors, for example, the representative colors of one or more recently coded CUs, before coding the palette table of the current CU. Given this palette dictionary, a color element in the palette table of the current CU may be predicted from the corresponding color element of the palette dictionary.

A reasonable size (e.g., a constant size or a maximum size) of the palette dictionary may be maintained. A palette dictionary update process may be applied after coding a CU, e.g., by adding the representative colors of the CU coded most recently that do not exist in the palette dictionary and removing the color elements that are less used. Because there may be strong correlations between the color values of neighboring CUs in the encoding/decoding order, the representative colors of the most recently coded CUs may be put at the beginning of the updated palette dictionary. Pruning may be performed after updating the palette dictionary or during the update process in order to remove any redundant entries such that unique colors may be kept in the palette dictionary.

Figure 11:
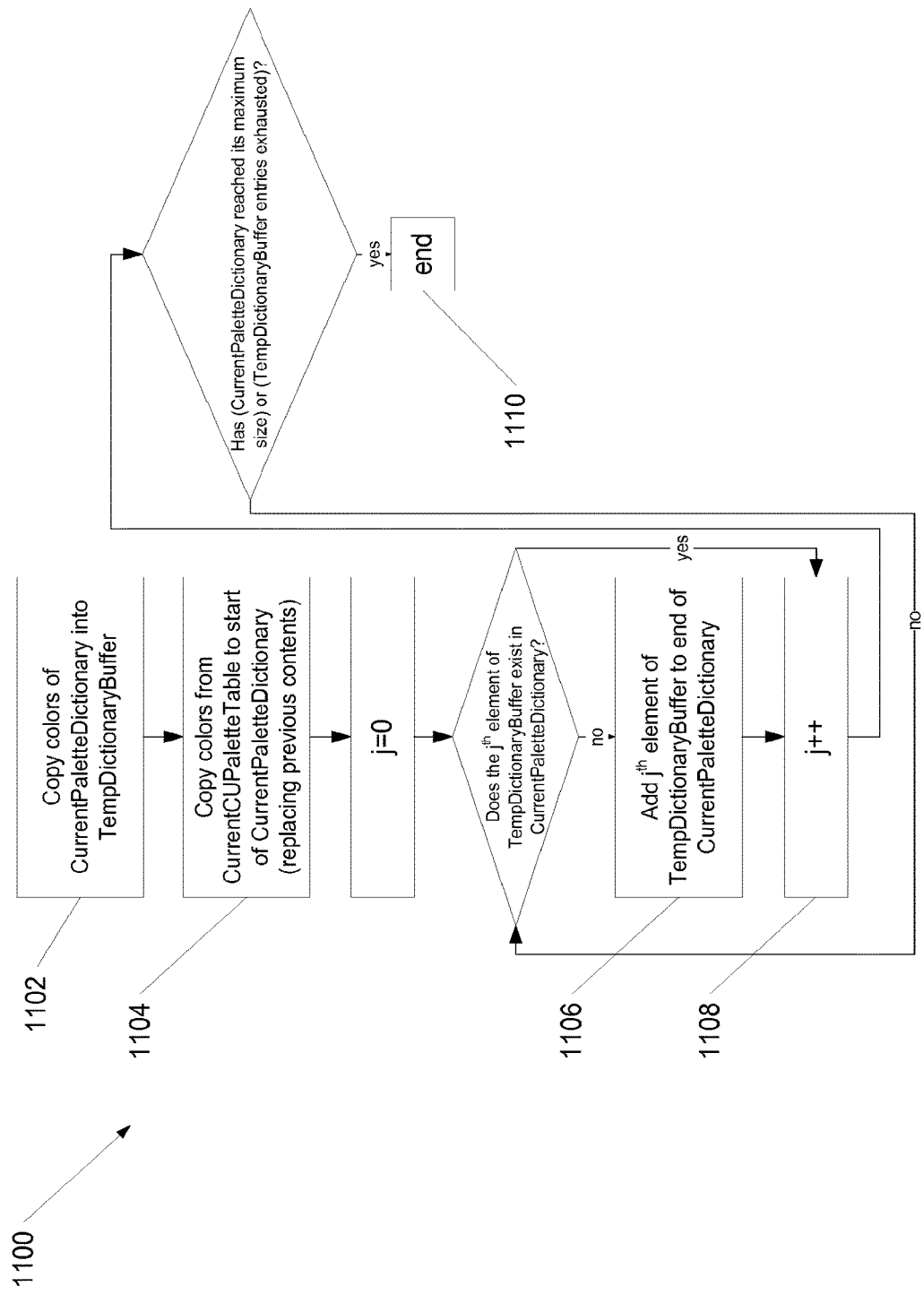
FIG. 11 is a flow diagram illustrating an example update process for dictionary-based palette table prediction.

FIG. 11 is a flow diagram illustrating an example update process 1100 for dictionary-based palette table prediction. At 1102, the colors stored in the buffer CurrentPaletteDictionary, which may store the current palette dictionary that may be used for prediction of or predictive encoding of a palette table for a CU, may be copied into a buffer TempDictionaryBuffer. CurrentPaletteDictionary may store a dictionary that was previously used for predicting or encoding the entries of the palette table for the previous CU. During the update procedure, CurrentPaletteDictionary may be a working buffer in which the updated palette dictionary may be constructed. TempDictionaryBuffer may be a buffer in which the contents of the previous palette dictionary are copied. These contents may be selectively merged into the working buffer in order to construct the updated palette dictionary. A counter j may be initialized.

At 1104, the colors from a palette table CurrentCUPaletteTable may be copied to the start of the buffer CurrentPaletteDictionary, e.g., replacing the previous contents of the buffer. CurrentCUPaletteTable may be the palette table of a current CU. The contents of this palette table may be copied into the starting positions of the working buffer, replacing previous contents. The entries of the palette table of the current CU may be given priority in the updated palette dictionary. The dictionary buffer's size may be larger than the palette table size of the current CU. The merge process may be used to fill out the remaining entries of the working buffer, e.g., up to a maximum size or capacity.

At 1106, if a $j^{th}$ element of the TempDictionaryBuffer does not exist in the buffer CurrentPaletteDictionary, it may be appended at the end of the buffer CurrentPaletteDictionary. This evaluation may be based on a comparison (e.g., an exact comparison) of color values or may test similarity of color values. For example, the test may compare the $j^{th}$ element of TempDictionaryBuffer to each entry of CurrentPaletteDictionary using a comparison metric such as an $L^2$ norm of the difference between the color entries expressed as vectors in YUV or RGB space. If a compared pair of entries are similar enough that the comparison metric is below a threshold, then the test may be positive (e.g., the $j^{th}$ element of TempDictionaryBuffer may be considered to already exist in CurrentPaletteDictionary).

At 1108, if the $j^{th}$ element of the TempDictionaryBuffer does exist in the palette dictionary, the counter j may be incremented. At 1110, if the buffer CurrentPaletteDictionary has reached its capacity or if the entries in TempDictionaryBuffer have been exhausted, the update process 1100 may end.

Palette dictionary entries may be ordered, such that entries that are more important or that are more frequently used may be positioned at the start of the palette dictionary, and entries that are less important or that are less frequently used may be positioned later in the order.

A large palette dictionary may provide more colors for prediction while increasing the overhead of encoding a predictor's position. A smaller palette dictionary may reduce overhead, but may provide fewer colors for prediction. To obtain a better tradeoff between prediction efficiency and the overhead, the size of the palette dictionary may be adaptively changed, e.g., at a picture level or at a sequence level. For example, the size of the palette dictionary may be set to a size according to the content and coding preferences, such as lossless coding, lossy coding, and prediction structures (e.g., all intra, random access, and/or low delay). The size of the palette dictionary may be set larger in lossless coding as compared with lossy coding. In lossy coding, the size of the palette dictionary may be set larger for an all intra coding configuration as compared with a random access and/or low delay configuration. The size of the palette dictionary may be signalled in a picture parameter set (PPS) and/or in a sequence parameter set (SPS). The prediction flag indicating if the color in palette dictionary is used for prediction or not may be coded. The number of prediction flags may be equal to the size of palette dictionary. When the palette dictionary size is increased, the method of signaling the prediction flags may be adjusted, e.g., optimized. For example, if the prediction flag is 1, an ending flag may be signalled to indicate if there are following "1" flags immediately after the prediction flag. If the ending flag is 1, there may be no following "1" flags, and there may be no need to code prediction flags anymore.

Figure 9:
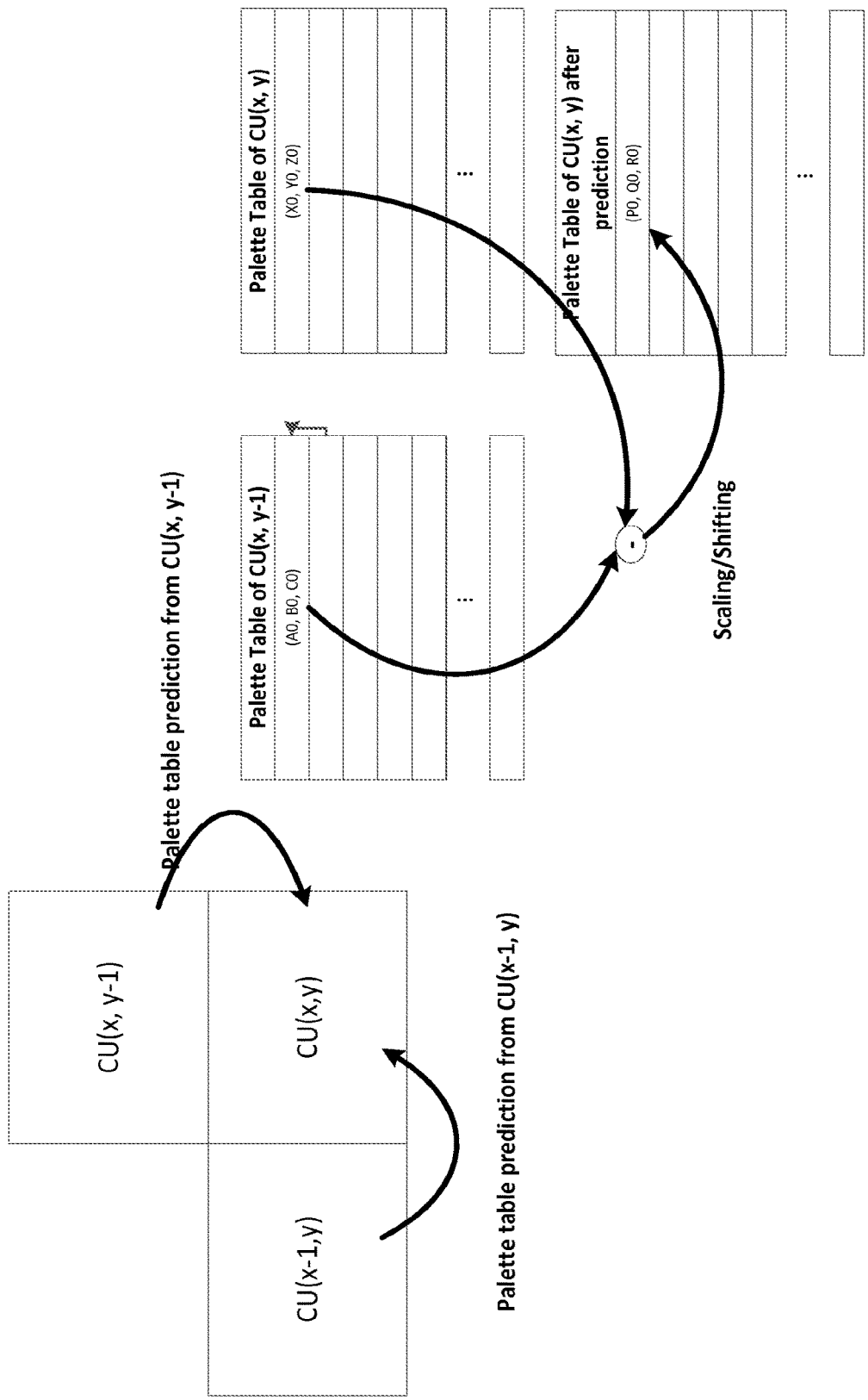
FIG. 9 illustrates exemplary techniques for predicting palette table entries for a CU from a preceding CU.

Palette table prediction may be performed in an element-wise manner in which a signaling flag may be used for a color element of the current palette table to indicate whether the corresponding element is predicted or not. In a palette table reuse mode, a palette table of a CU may be copied from the colors generated from the palette table predictor. A new set of colors for the palette table of the CU. When the palette table is copied (e.g., entirely copied), signaling the palette table may be omitted. A flag may be used to signal whether the entries of the palette table predictor are used as the color elements of the palette table of the current CU. If so, the encoding process for the current CU's palette table may be skipped, and the decoder may reuse the palette table predictor as the palette table of the current CU. If not, another flag may be used to signal if the palette table of the current CU is predicted from a preceding CU's palette table. For example, as shown in FIG. 9 and disclosed herein, a table entry may be predicted by using the corresponding entry position of its predictor. Furthermore, the difference between the current table entry and its predictor may be scaled or shifted. The palette table size may be signaled by using differential coding with the prediction from the palette table size of the preceding CU.

The palette table reuse mode may be operated independently of or in combination with palette table merging as disclosed herein. For example, palette table merging may be combined with the palette table reuse mode to predictively encode the palette table information of the CUs that are coded in palette mode.

A palette index may be built that maps a pixel in the block (e.g., a CU) to a color stored in the palette table. To determine the palette index for a pixel, a palette table element with the minimal error relative to the pixel may be determined. The error may be measured, for example, by the absolute value of the difference or the square of the difference. The pixels of a block may be converted to the palette index, as shown in FIG. 5B. However, due to the storage size limitation of the palette table, a pixel may not have an exact match in palette table. Therefore, a residue value of a pixel relative to the corresponding palette table element may be encoded so that it may be used to refine the image at the decoder side. If a lossless compression mode is used, then the residue values may be encoded by entropy coding process. In an embodiment, the residue values may be encoded directly, e.g., without transform and quantization. If a lossy compression mode is used, then the residue values may be encoded by transform, quantization, and entropy coding processes.

Coding tools may be used to reduce the overhead of storing the palette index map. These coding tools may include, for example, run calculation, two-dimensional pattern prediction, and/or palette index scan order.

A "run" value may be used to indicate the length of the consecutive positions that have the palette index. There may be multiple kinds of prediction modes, e.g., run mode and copy mode. In a run mode, an index value at a position may be compared to an index value at a previous position (e.g., the position to the left, assuming normal horizontal raster scan order in run mode or the position above assuming normal vertical scan order in copy mode). If run mode is indicated, if the index value of the current pixel is the same as the index value of the pixel in the previous position, the run value may be increased until a pixel with a different index value is encountered. If copy mode is indicated, the index value at a position in the palette index map may be compared to the index value at the position immediately above the current position. If they share the same index value, then the run value may be increased.

Figure 12:
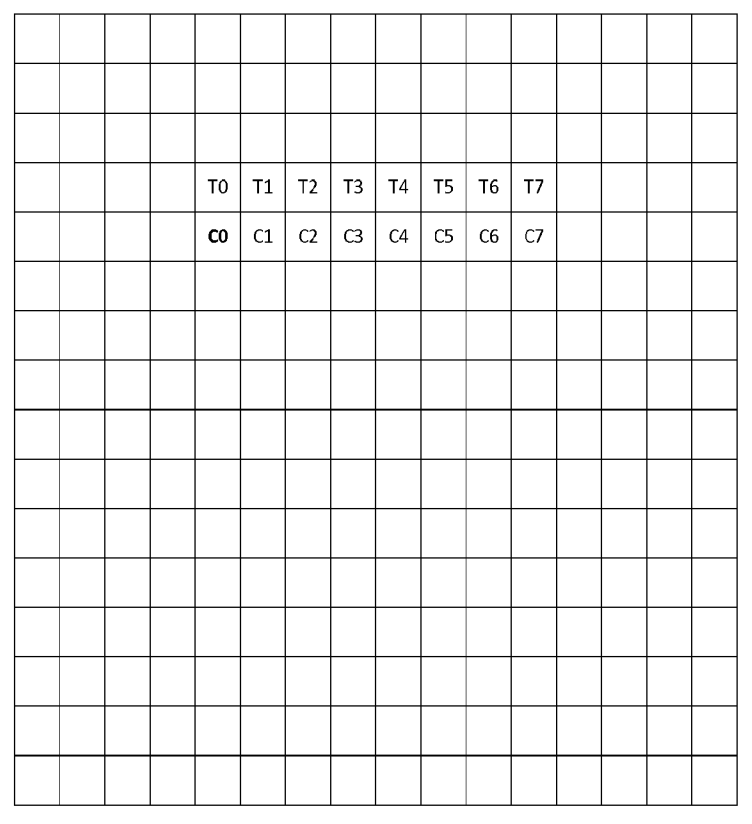

In a run mode, the index and/or run value of the first pixel's color value in the index map may be coded, e.g., the index may be coded, and the run value may be coded. In a copy mode, the run value (e.g., only the run value) may be coded, e.g., the indices that represent the pixel color values may be copied from the previously coded row. An encoder may select a copy mode if both modes have the same run value because selecting the copy mode may result in less side information (e.g., a copy mode may use fewer bits to represent the same number of pixels). As shown in FIG. 12, if a current position C0 is coded as a run mode, and the color value index of C0 is the same as its top pixel T0, the run of the current row that begins at C0 may be larger than the number of identical pixels starting with T0 of the above row; otherwise, the encoder may have selected a copy mode. In the example shown in FIG. 12, the run of the top row may be 6. In this example, the run of the current row may be greater than 6. The difference between the run of the current row and the run of the top row (e.g., only the difference) may be coded.

For example, the encoder may select the run mode when the run value of the run mode is greater than the run value of the copy mode. For example, a constraint flag may be included in the bitstream (e.g., in a sequence parameter set) to signal that the bitstream is generated with the constraint.

A segment may include a group of pixels coded in a run mode or in a copy mode. In a run mode, two syntax elements (e.g., index, run) may be coded. In a copy mode, a syntax element (e.g., run) may be coded. C0 may be the first position of the current segment. T0 may be the above position of C0. Row(x) may be the row number of position x. Run(x) may be the value of run at the position x. An encoder decision may be made by, for example, encoding the run value as Run(C0)–run_top–1 or as Run(C0), e.g., according to the following:

```
if (Row(C0)>0 && mode(C0) == RUN and index(C0) == index(T0) )
{
    run_top = 0;
    While(run_top< BlockWidth && index(T0+run_top) == index(T0+run_top+1))
        run_top++;
    run_for_encoding = Run(C0) - run_top-1;
}
else
{
    run_for_encoding = Run(C0);
}
```

At the decoder, the value of "run" for the run mode may be interpreted, for example, according to the following:

```
DecodeMode(C0);
    if (mode(C0) == RUN)
{
        DecodeIndex(C0);
        DecodeRun(C0);
        if(Row(C0) >0 && index(C0) == index(T0))
        {
            run_top = 0;
            While(run_top< BlockWidth && index(T0+run_top) == index(T0+run_top+1))
                run_top++;
            Run(C0) += run_top+1;
        }
}
```

Figure 8:
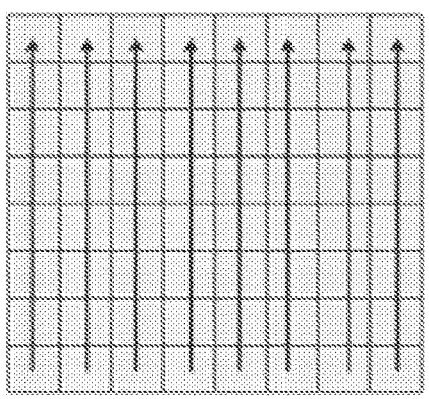
FIG. 8 illustrates a plurality of example PPU scan orders in accordance with an embodiment.
Figure 8:
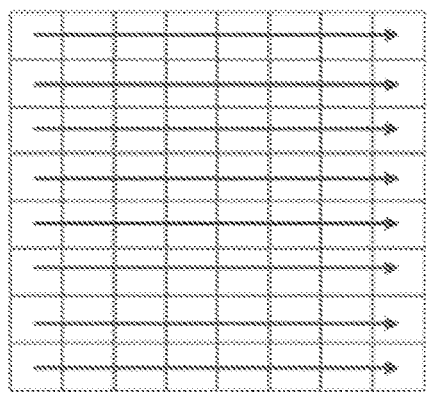
Figure 8:
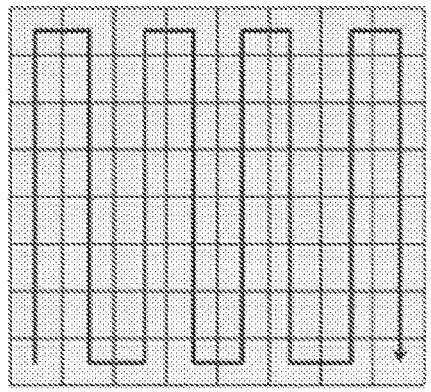
Figure 8:
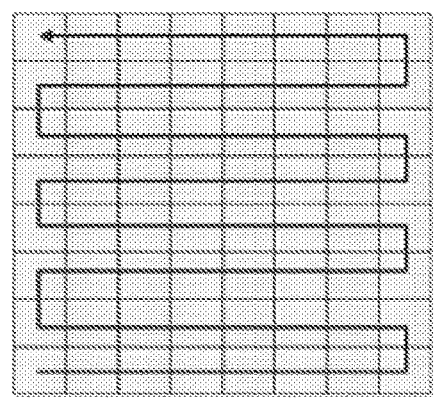
Figure 8:
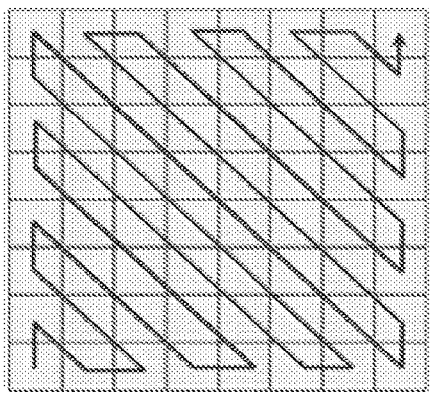
Figure 8:
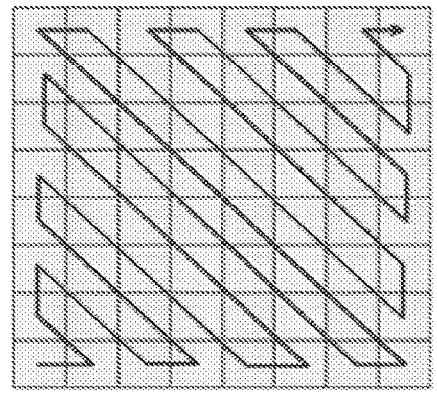

While the example illustrated in FIG. 12 may use row-wise encoding, a similar technique may be applied for other directional encodings of the runs. For example, any of the scan orderings shown in FIG. 8 may be used. If the column-wise encoding in FIG. 8(b) is used, the comparison may be between pixels in a current column and pixels in a previously-encoded adjacent column. If the diagonal scan encoding in FIG. 8(e) is used, the comparison may be between pixels along a current diagonal and pixels along a previously-encoded adjacent diagonal.

Figure 6:
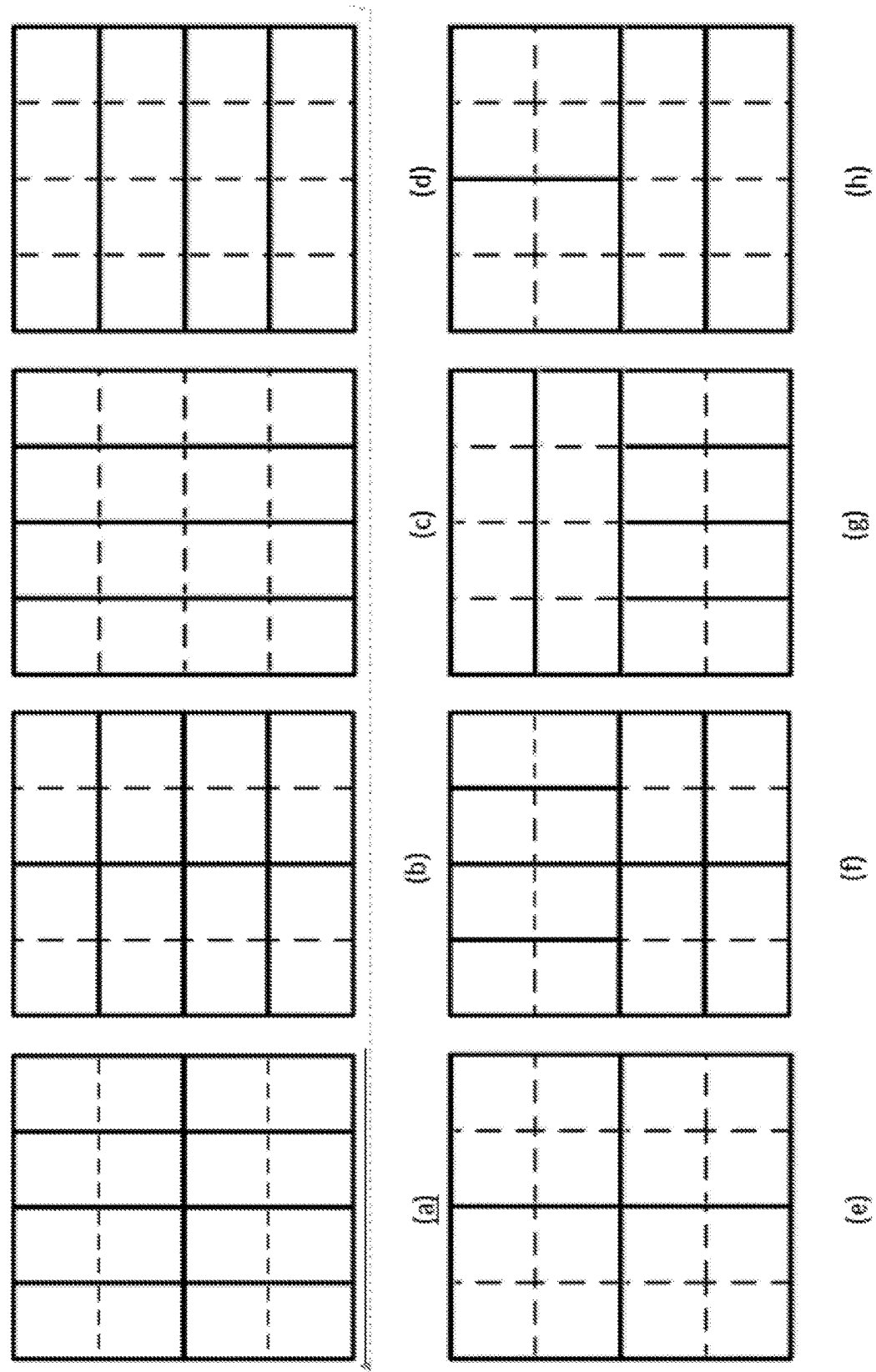
FIG. 6 shows a plurality of two-dimensional patterns that may be used for two-dimensional pattern prediction in accordance with an embodiment.

In palette-based screen content coding, the palette index of each pixel may be predicted for one pixel after another. A two-dimensional pattern may group pixels together into larger units (e.g., pixel pattern units or PPUs) such that the magnitude of run values and the number of runs may be reduced. Some examples of two-dimensional patterns are illustrated in FIG. 6, in which solid lines may demarcate the separation between PPUs and dashed lines may demarcate individual pixels within the PPUs. For example, if a 1×2 pattern is used, as shown at (a), the two pixels in each PPU may share the same run value. As compared to using a 1×1 pattern, a 1×2 pattern may reduce the amount of run elements to encode the video signal. When the indices of the two pixels are the same, the magnitude of the run value may be reduced.

Patterns (a) through (h) in FIG. 6 are some exemplary patterns for PPUs. Pattern (a) is a two pixel pattern that may include two vertically adjacent pixels. Pattern (b) is a two pixel pattern that may include two horizontally adjacent pixels. Pattern (c) is a four pixel pattern that may include four vertically adjacent pixels. Pattern (d) is a four pixel pattern that may include four horizontally adjacent pixels. Pattern (e) is a four pixel pattern that may include four adjacent pixels in a square.

Hybrid patterns may combine multiple inhomogeneous two-dimensional patterns, as shown by patterns (f)-(h). For instance, PPU pattern (f) may include 16 pixels arranged as four pattern (b)s positioned above four pattern (a)s. Pattern (g) may include 16 pixels arranged as two pattern (c)s above two pattern (d)s. Pattern (h) may include two pattern (e)s positioned above two pattern (d)s. Many other patterns and pattern sizes may be possible.

To signal the usage of two-dimensional pattern prediction, a value of N may be coded to signal whether or not two-dimensional pattern prediction is used in the current CU. For instance, if N is equal to 0, a 1×1 pattern may be used in the current CU. Otherwise, the value of N may be used to indicate which of the various predefined two-dimensional patterns may be used in the current CU.

Figure 7:
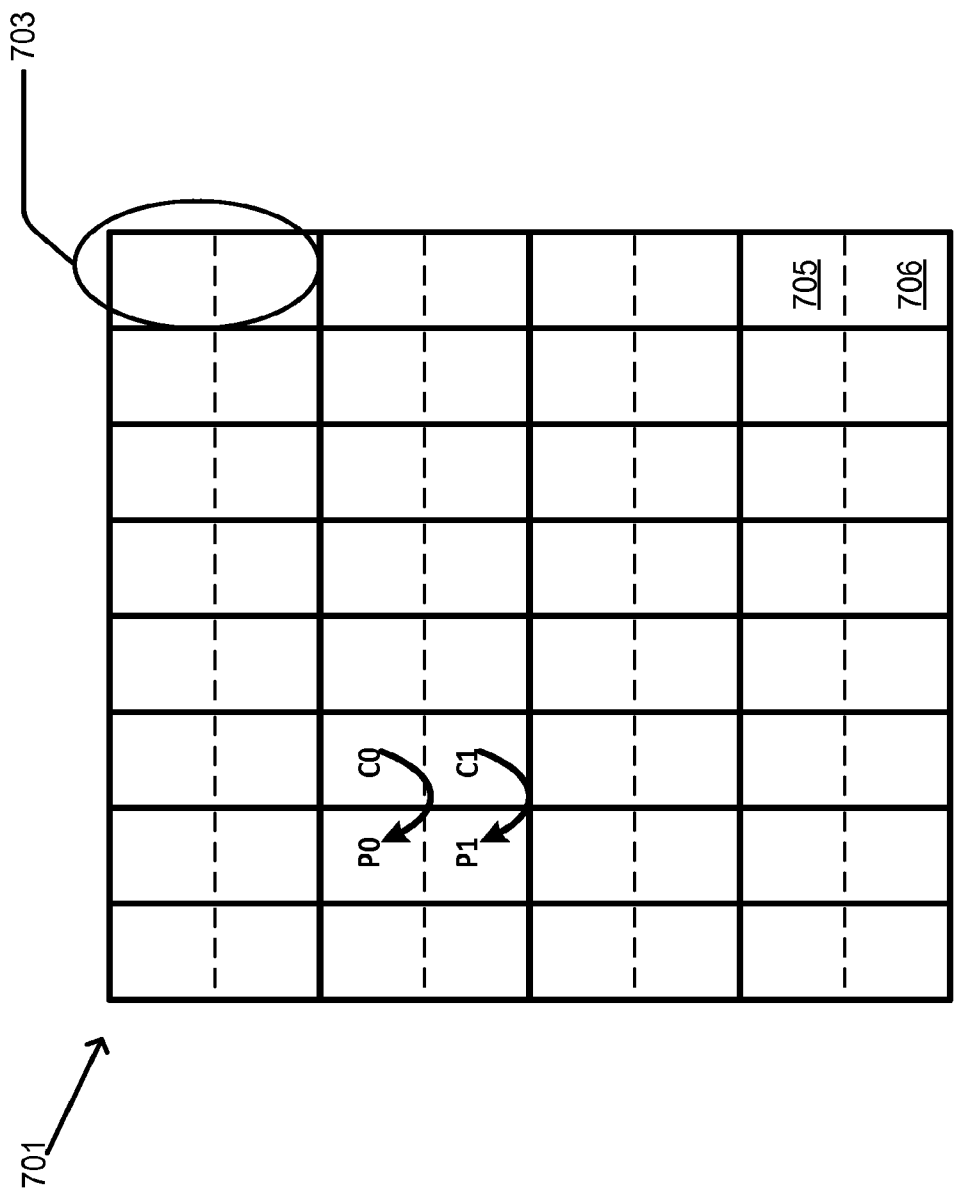
FIG. 7 illustrates an exemplary prediction order scheme for two-dimensional pattern prediction in accordance with an embodiment.

If this two-dimensional pattern prediction method is used, then, when performing the run mode prediction, a pixel inside the pattern may be compared to the pixel in the corresponding position of the nearest pattern along the inverse direction of the palette index scan order. For example, FIG. 7 shows a CU 701 composed of PPUs 703 using the two pixel, 1×2 PPU pattern (a) from FIG. 6. In these PPUs, there may be two pixels 705, 706 per PPU, e.g., top and bottom. Top pixel C0 of the current PPU may be predicted from top pixel P0 of the PPU immediately to the left of the current PPU (except, for example, for the first PPU in a row), and bottom pixel C1 of the current PPU may be predicted from bottom pixel P1 of the PPU immediately to the left of the current PPU.

If copy mode prediction is used (such that the preceding PPU in the scan order may be the PPU above the current PPU, rather than the PPU to the left of the current PPU), a pixel inside the pattern may be compared to its collocated pixel location in its preceding PPU. In order to fast search the collocated pixel (e.g., the pixel having the corresponding position) in the preceding PPU, two lookup tables may be used for run and copy modes, and the two lookup tables for each block size and two-dimensional pattern may be pre-defined at the encoder and decoder sides.

For the palette index scan order, a portion or position (e.g., pixel or PPU) of the CU (or other block segment of the video data) may be predicted in vertical or horizontal raster scan order, as shown in patterns (a) and (b), respectively, of FIG. 8. A portion or position of the CU may be predicted in a scan line order, as shown, for example, in patterns (c) and (d) of FIG. 8. A scan line may be horizontal or vertical, for example, and may include one or more horizontal and/or vertical line portions.

A scan line (e.g., a raster line) may be scanned in the opposite direction of the preceding parallel scan line, as shown by patterns (c) and (d) in FIG. 8 for run mode and copy mode, respectively. The likelihood of similarity of the palette indices between sequentially scanned PPUs in the scan order path may be preserved. For example, at the ends of raster lines, the sequentially next PPU is located physically adjacent the previously scanned PPU in the actual video image. In an example, the scan order may be a diagonal zig-zag, as illustrated by scan order patterns (e) and (f) in FIG. 8.

The value of the PPU to be used as the basis for index prediction may be reset to the PPU immediately above the current PPU for the PPU in the first position of each row when doing run mode prediction with raster scan order.

For example, the blocks may include eight pixels arranged in a 4×2 pattern, and one block may include pixels having the following values:

A B C D
A A A D

The prediction for the first position of the second row in a run mode may be D because that is the value of the pixel in the preceding position, e.g., the last position of the first row. If the value of the pixel prediction is reset to the PPU immediately above the current PPU, the prediction in run mode may be A because that is the value of the pixel immediately above that pixel (e.g., in the first position of the first row). Because the next two consecutive A's in the second row also are A's, the encoding may be A (e.g., corresponding to the color value of the first pixel in the first row) with a run value of 3 (e.g., corresponding to the first three pixels in the second row). The scanning mode may switch between run mode and copy mode in the middle of a run value.

The same concept can be applied in run mode in vertical scan order, in which case the value of the PPU to be used as the basis for pixel prediction for the PPU in the first position of each column may be reset to the PPU immediately to the left of that PPU.

Syntax elements may signal CUs that may be coded with a palette coded mode may be signaled. Palette coding as disclosed herein may be signalled in the bitstream using syntax elements. For example, at the CU level, palette_table_reuse_flag may indicate whether the current CU reuses the color elements of the palette table predictor as the palette table of the current CU or not. If palette_table_reuse_flag is equal to 1, the palette table reuse mode may be applied to the current CU. The color elements in the palette table of the current CU may be copied from that of the palette table predictor. If palette_table_reuse_flag is equal to 0, the current CU may use a new set of colors as its palette table.

A syntax element, such as palette_pattern_mode, may indicate whether the two-dimensional palette coding is enabled and which coding pattern is used. If palette_pattern_mode is equal to 0, a 1×1 pattern may be used. Otherwise, the value of palette_pattern_mode may be used to indicate which predefined two-dimensional pattern (see, e.g., exemplary patterns in FIG. 6) is used in the current CU.

A syntax element, such as palette_index_scan_order, may be used to signal which palette index scan order is used. For example, if palette_index_scan_order is equal to 0, the raster scan order may be used in the palette index prediction process. Otherwise, the value of palette_index_scan_order may be used to indicate which predefined scan order (see, e.g., exemplary patterns in FIG. 8) is used. For example, whether the traverse scan is performed horizontally with horizontally scan lines or vertically with vertical scan lines may be signaled.

Table 1 illustrates example syntax elements.

TABLE 1

| coding_unit( x0, y0, log2CbSize ) { | Descriptor |
|---|---|
| if( transquant_bypass_enabled_flag ) | |
|   cu_transquant_bypass_flag | ae(v) |
|   nCbS = ( 1 << log2CbSize ) | |
| if (palette_mode_flag) { | |
| palette_table_reuse_flag | |
| if (!palette_table_reuse_flag) | |
| { | |
|   palette_size_minus1[x0][y0] | ae(v) |
| for (cIdx = 0; cIdx < 3; cIdx ++) | |
|   for( i = 0; i <=palette_size_minus1[x0][y0]; i ++ ) | |
|     palette[x0][y0][ cIdx ][i] | ae(v) |
|     scanPos = 0 | |
| palette_pattern_mode | ae(v) |
| palette_index_scan_order | ae(v) |
| while (scanPos < nCbS * nCbS) { | |
|   run_mode_flag | ae(v) |
|   if (run_mode_flag) | |
|   { | |
|     palette_index | ae(v) |
|   } | |
|   Run | ae(v) |
|     runPos= 0 | |
|     while (runPos <= run){ | |
|       if (palette_index_scan_order){ | |
|         mapIdx = | |
|         palette_index_scan_order_table[scanPos] | |
|       } | |
|       else{ | |
|         mapIdx = scanPos | |
|       } | |

TABLE 1-continued

```
coding_unit( x0, y0, log2CbSize ) {                                    Descriptor
    if (run_mode_flag){
        for (paYIdx=0; paYIdx<paYS; paYIdx++){
            for (paXIdx=0; paXIdx<paXS; paXIdx++){
                paletteIdx[ x0 ][ y0 ] [mapIdx+ paYIdxx
                nCbS +paXIdx] = palette_index
            }
        }
    }
    else{
        for (paYIdx=0; paYIdx<paYS; paYIdx++){
            for (paXIdx=0; paXIdx<paXS; paXIdx++){
                copyModeIdx = copyModeRefPosition[mapIdx+
                paYIdxxnCbS +paXIdx];
                paletteIdx[ x0 ][ y0 ] [mapIdx+ paYIdxxnCbS +
paXIdx] = paletteMap[ x0 ][ y0 ]
[copyModeIdx]
            }
        }
    }
    runPos ++
    scanPos+= paYSxpaXS
        }
        }
        }
    }
    else {
    if( slice_type != I )
    .....
    }
```

Figure 13A:
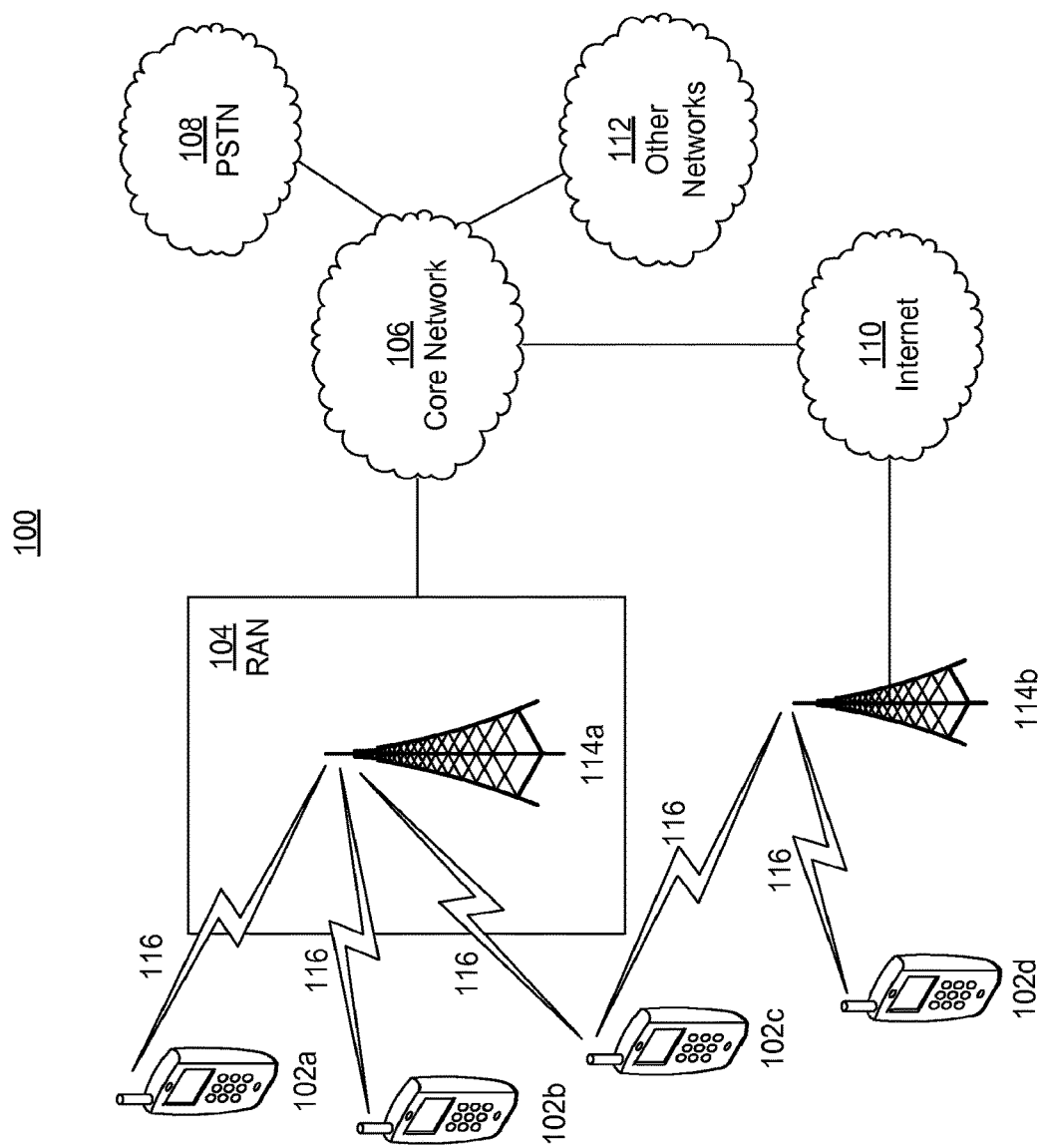
FIG. 13A is a system diagram of an example communications system in which one or more disclosed embodiments may be implemented.

FIG. 13A is a diagram of an exemplary communications system 100 in connection with which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN).

In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 13A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 13A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

Figure 13B:
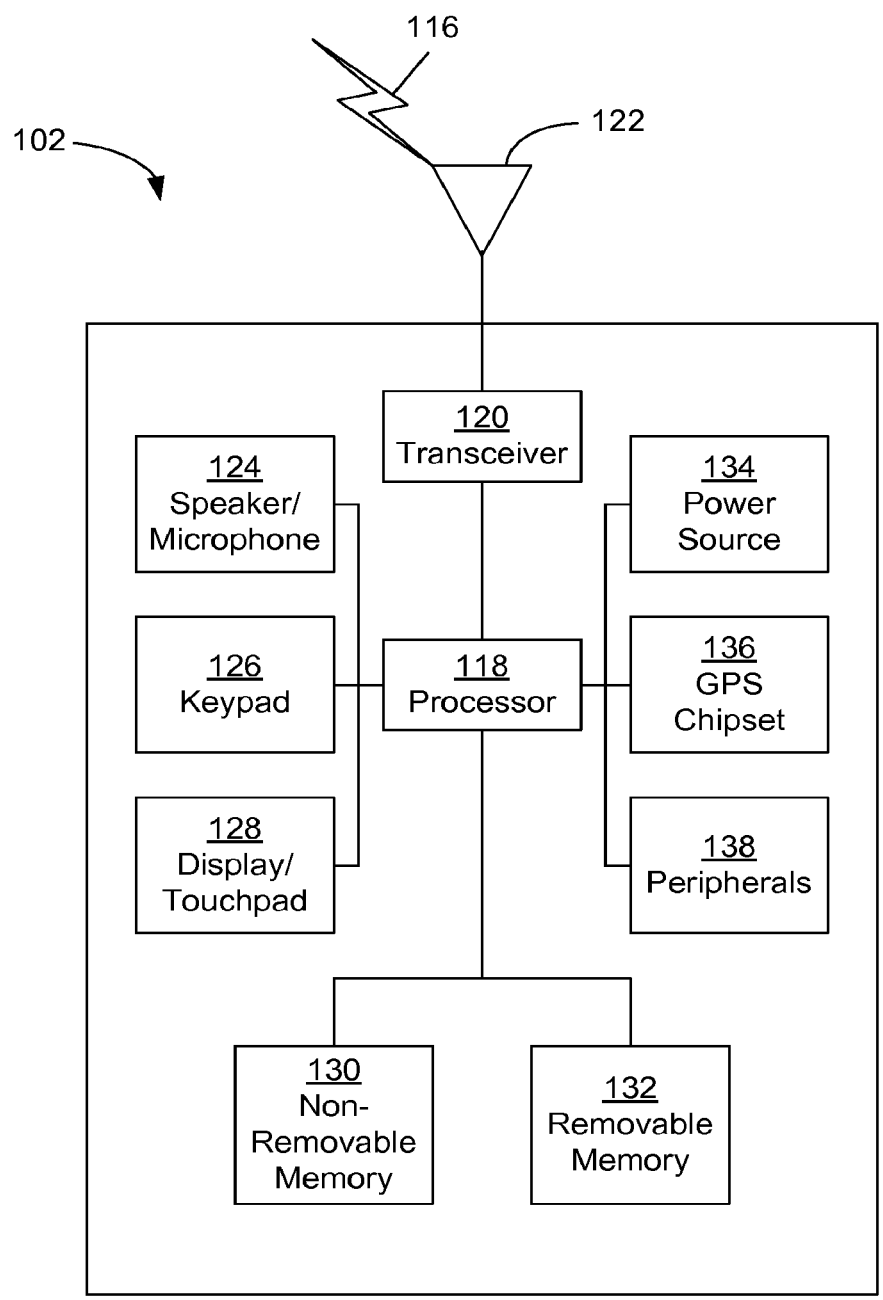
FIG. 13B is a system diagram of an example wireless transmit/receive unit (WTRU) that may be used within the communications system illustrated in FIG. 13A.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13C:
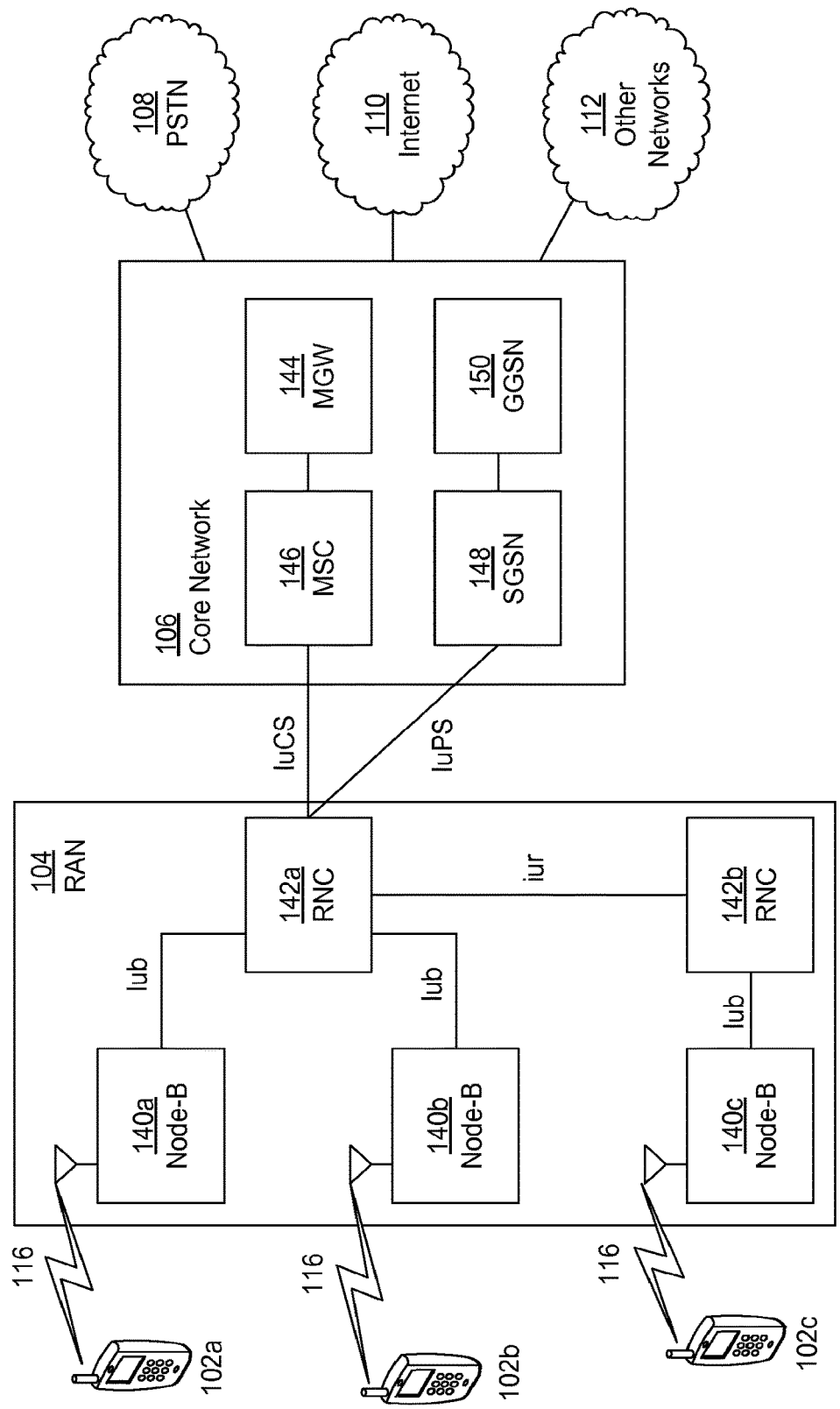
FIGS. 13C, 13D, and 13E are system diagrams of example radio access networks and example core networks that may be used within the communications system illustrated in FIG. 13A.

FIG. 13C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 13C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
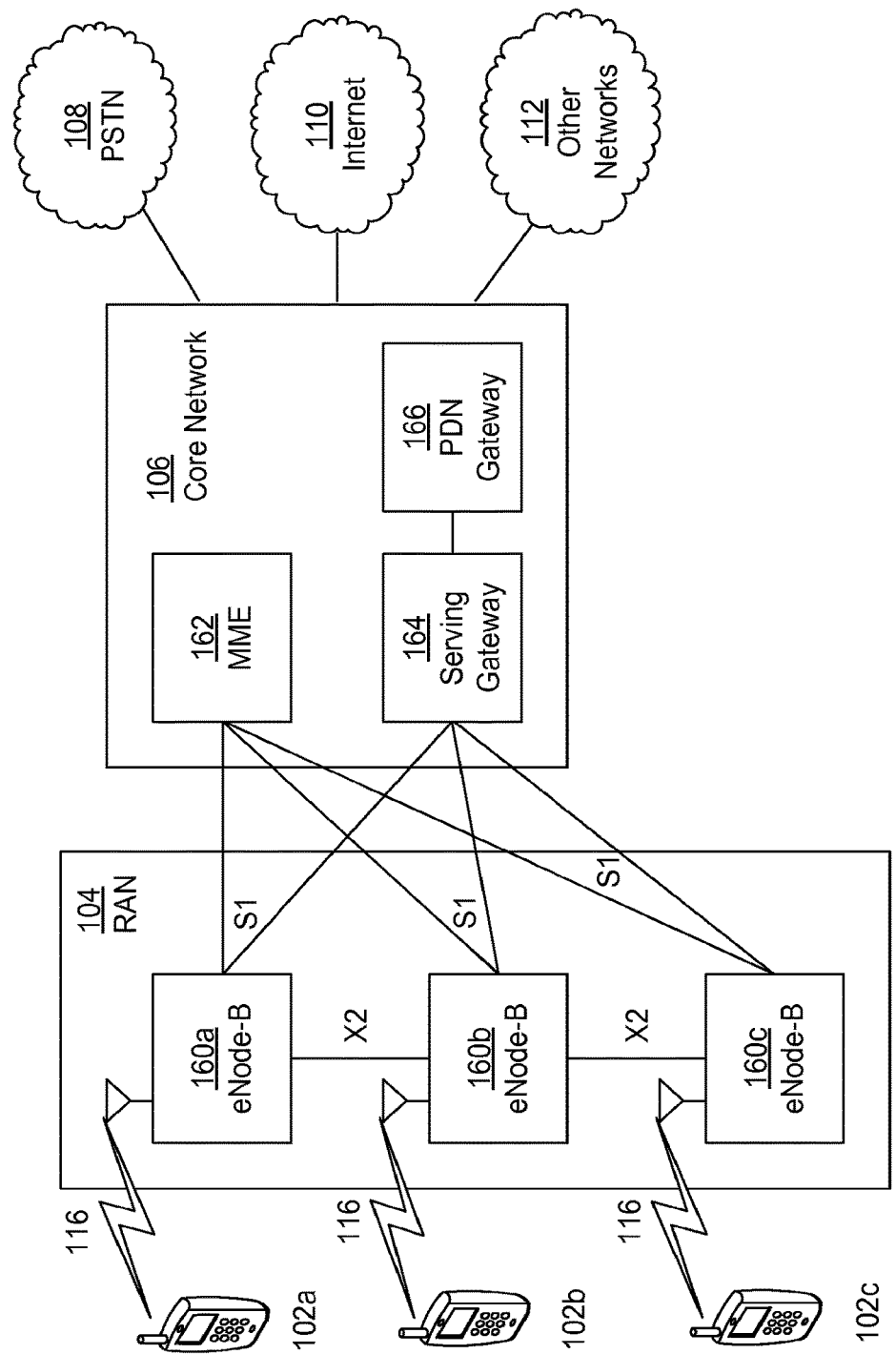

FIG. 13D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 106 shown in FIG. 13D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 13E:
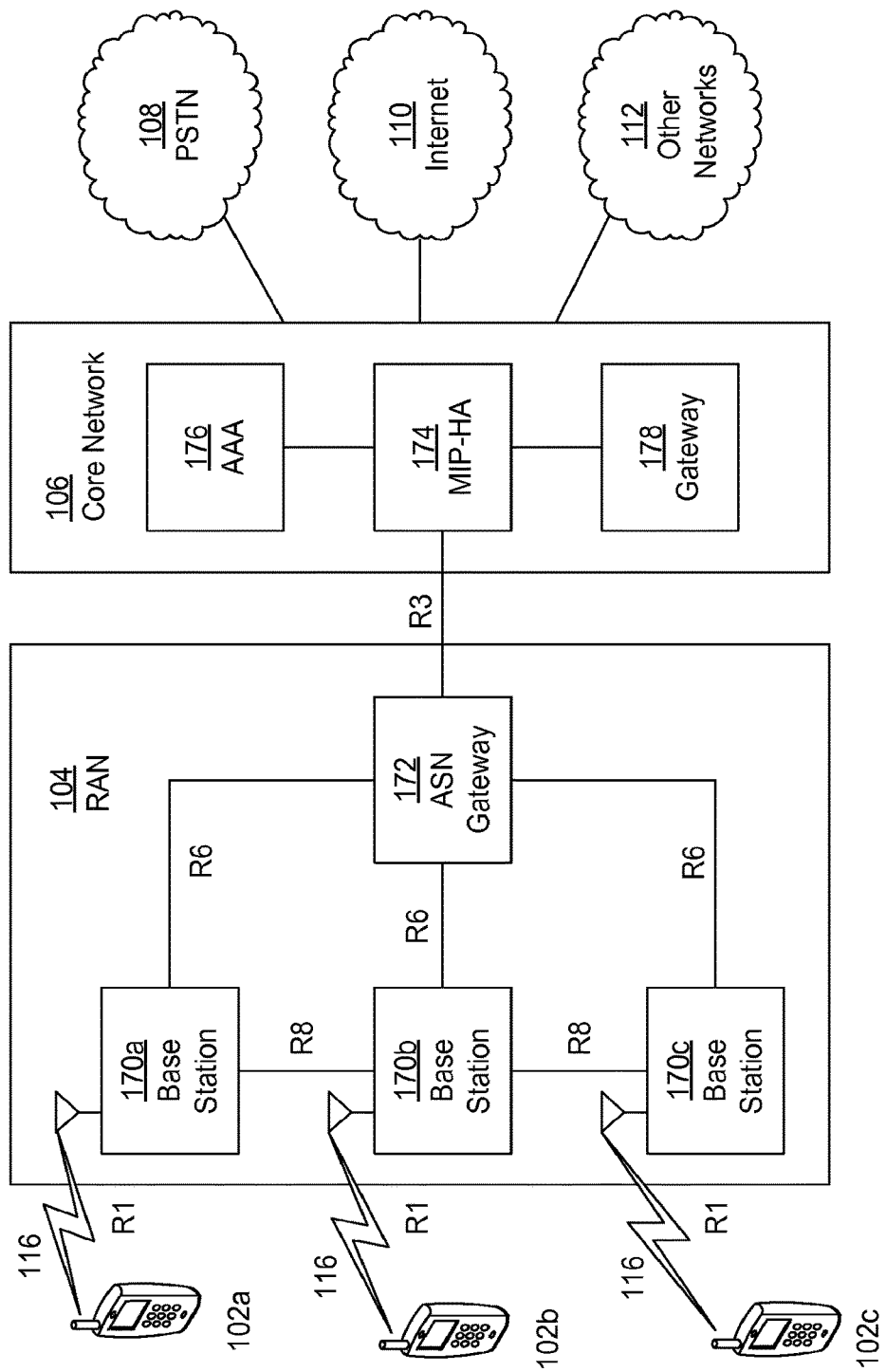

FIG. 13E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 13E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 100c.

As shown in FIG. 13E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 13E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

The invention claimed is:

1. A method for decoding video data, the method comprising:
   obtaining a prediction mode, an encoded run value, and a first palette index value associated with a current position in a current row;
   upon determining that the prediction mode is a run mode and the first palette index value is equal to a second palette index value associated with a corresponding position in a previous row, determining that the encoded run value indicates a run difference value indicative of a difference between a first run value associated with the current position and a second run value associated with the corresponding position in the previous row;
   upon determining that the encoded run value indicates the run difference value, calculating the first run value associated with the current position based on the run difference value and the second run value associated with the corresponding position in the previous row; and
   associating, based on the first run value, a number of consecutive positions following the current position with the first palette index value.

2. The method of claim 1, wherein the first run value associated with the current position is calculated based on adding the run difference value and the second run value associated with the corresponding position in the previous row.

3. The method of claim 1, wherein the first run value associated with the current position indicates the number of consecutive positions following the current position.

4. The method of claim 1, wherein the corresponding position is above the current position.

5. The method of claim 1, wherein the corresponding position is to the left of the current position.

6. The method of claim 1, further comprising on a condition that the first palette index value associated with the current position is not equal to the second palette index value associated with the corresponding position in the previous row, determining that the encoded run value indicates the number of consecutive positions following the current position having a palette index value that is equal to the first palette index value.

7. A device for decoding video data, the device comprising:
   a processor configured to:
   obtain a prediction mode, an encoded run value, and a first palette index value associated with a current position in a current row;
   upon determining that the prediction mode is a run mode and the first palette index value is equal to a second palette index value associated with a corresponding position in a previous row, determine that the encoded run value indicates a run difference value indicative of a difference between a first run value associated with the current position and a second run value associated with the corresponding position in the previous row;
   upon determining that the encoded run value indicates the run difference value, calculate the first run value associated with the current position based on the run difference value and the second run value associated with the corresponding position in the previous row; and
   associate, based on the first run value, a number of consecutive positions following the current position with the first palette index value.

8. The device of claim 7, wherein the processor is configured to calculate the first run value associated with the current position based on adding the run difference value and the second run value associated with the corresponding position in the previous row.

9. The device of claim 7, wherein the first run value associated with the current position indicates the number of consecutive positions following the current position.

10. The device of claim 7, wherein on a condition that the first palette index value associated with the current position is not equal to the second palette index value associated with the corresponding position in the previous row, the processor is further configured to determine that the encoded run value indicates the number of consecutive positions following the current position having a palette index value that is equal to the first palette index value.

11. The device of claim 7, further comprising a memory operatively connected to the processor.

* * * * *